United States Patent [19]

Morishita et al.

[11] Patent Number: 4,967,670
[45] Date of Patent: Nov. 6, 1990

[54] ATTRACTION TYPE MAGNETIC LEVITATING APPARATUS

[75] Inventors: Mimpei Morishita, Fuchu; Teruo Azukizawa, Tokyo, both of Japan

[73] Assignee: Kabushiki Kaisha Toshiba, Kawasaki, Japan

[21] Appl. No.: 494,225

[22] Filed: Mar. 15, 1990

Related U.S. Application Data

[62] Division of Ser. No. 329,255, Mar. 27, 1989, Pat. No. 4,924,778.

[30] Foreign Application Priority Data

Mar. 30, 1988 [JP] Japan .................................. 63-76921

[51] Int. Cl.⁵ ....................... B60L 13/06; B60L 13/00
[52] U.S. Cl. .................................... 104/284; 104/293
[58] Field of Search ...................... 104/292, 293, 138.1, 104/284, 281

[56] References Cited

U.S. PATENT DOCUMENTS

| | | | |
|---|---|---|---|
| 3,871,301 | 3/1975 | Kolm et al. ...................... | 104/292 X |
| 4,800,818 | 1/1989 | Kawaguchi et al. ............ | 104/292 X |
| 4,838,172 | 6/1989 | Morishita ......................... | 104/293 X |

Primary Examiner—Jospeh F. Peters, Jr.
Assistant Examiner—Virna Lissi Mojica
Attorney, Agent, or Firm—Oblon, Spivak, McClelland, Maier & Neustadt

[57] ABSTRACT

A plurality of stators of a linear induction motor are arranged at predetermined intervals, and guide rails are mounted on an upper portion of a track frame having a U-shaped section. A levitated object is magnetically levitated below the track frame so as to freely travel along the guide rails. Magnetic support units having electromagnets for obtaining a levitating force, optical gap sensors for detecting gap lengths between the support units and the guide rails, i.e., deviations in a levitating direction, and optical gap sensors for detecting deviations in a guiding direction perpendicular to a traveling direction of the levitated object are respectively arranged on the four corners of the upper surface of the levitated object. The length of each magnetic support unit is larger than the width of each guide rail. Each magnetic support unit is disposed such that the inner ends of the unit and the guide rail are aligned, and the outer end of the unit extends outward from that of the guide rail. A deviation between an output from each optical gap sensor and a corresponding reference value is fed back to a corresponding magnetic support unit, thereby controlling each electromagnet.

13 Claims, 30 Drawing Sheets

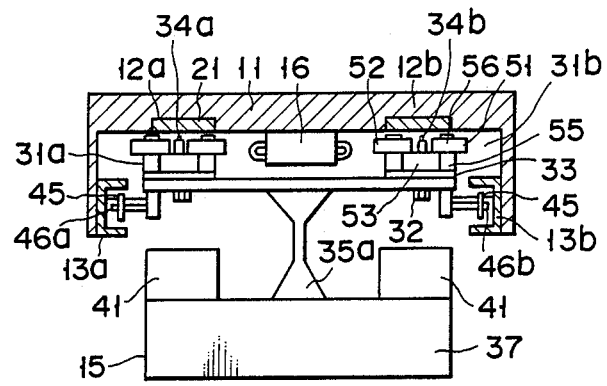
F I G. 2
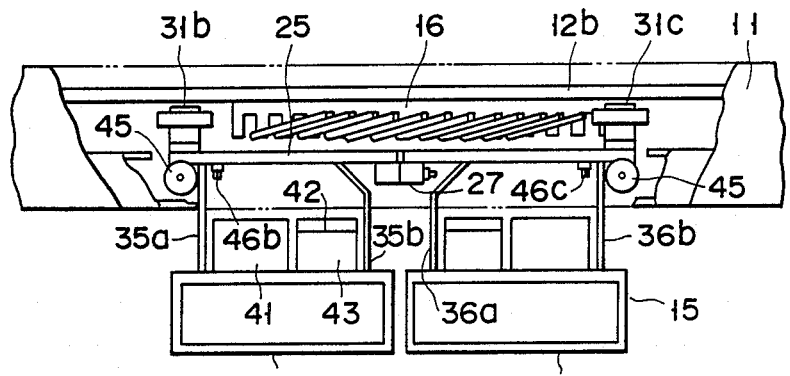
F I G. 3
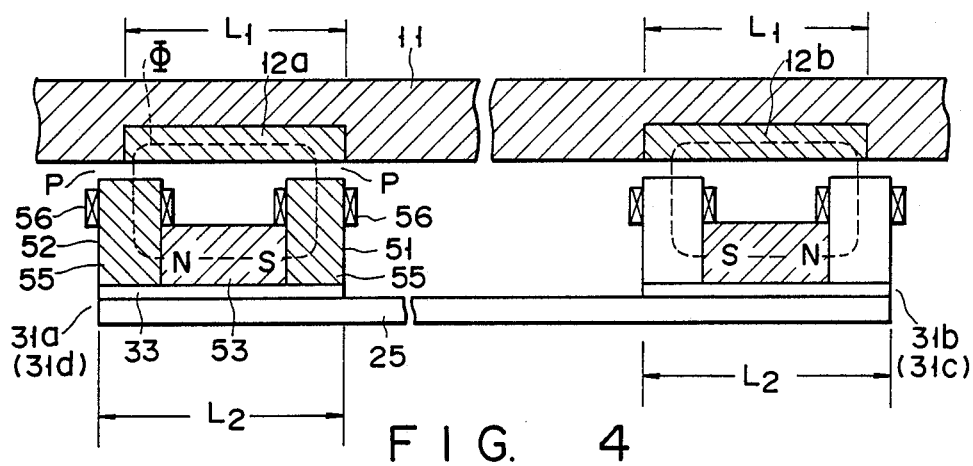
F I G. 4

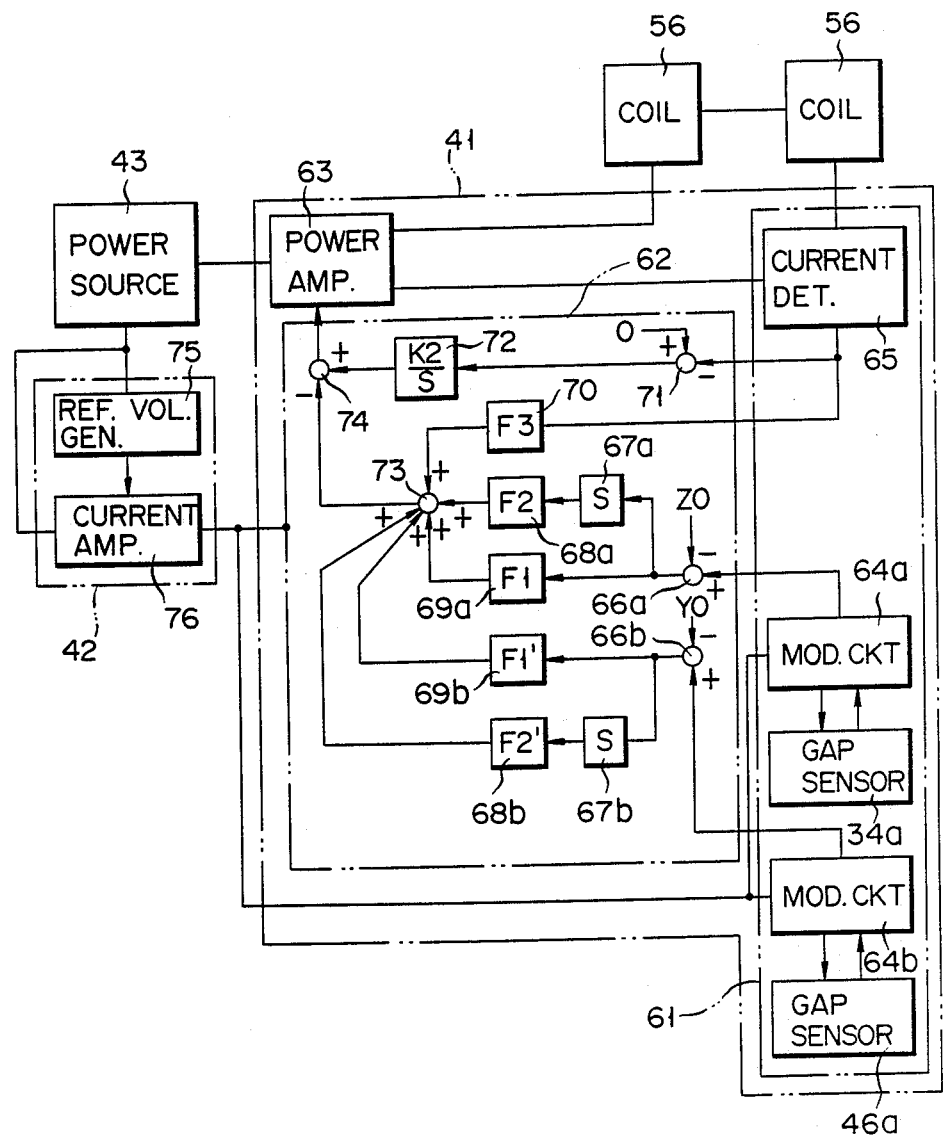
F I G. 5

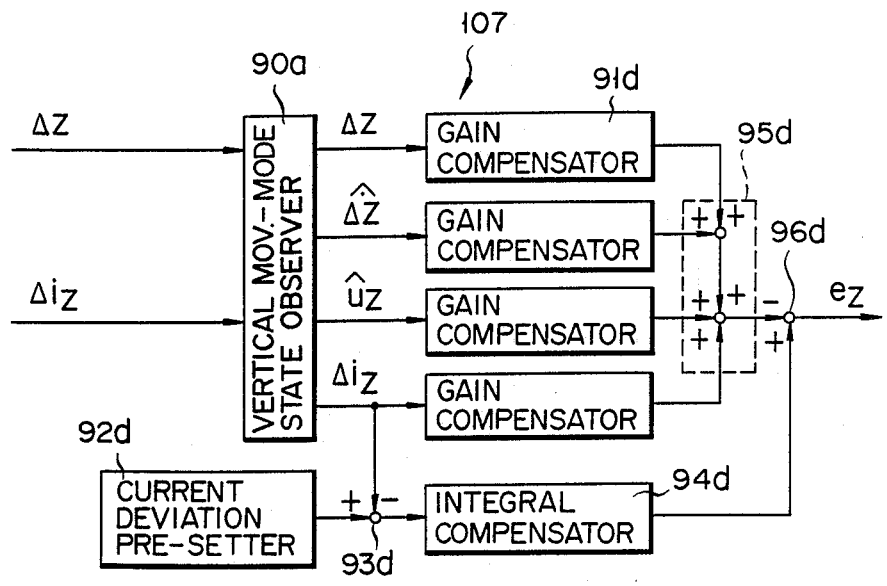
F I G. 18
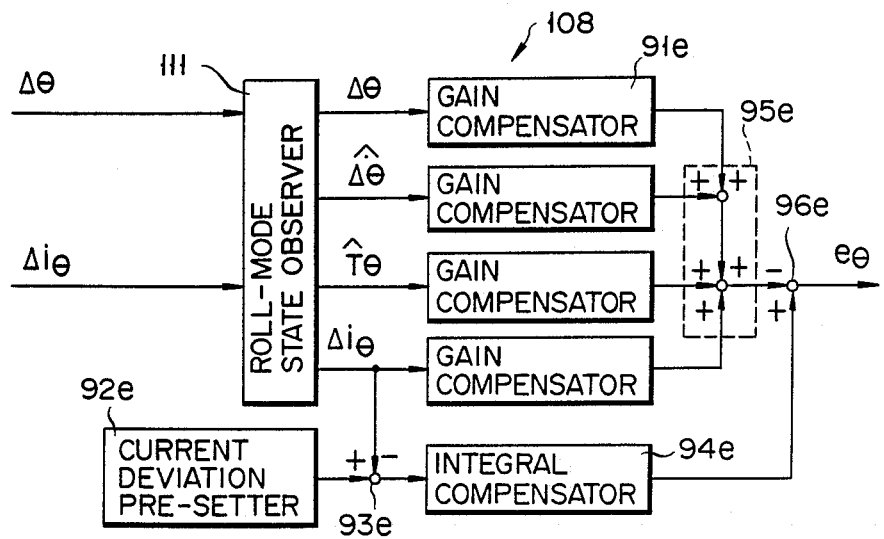
F I G. 19

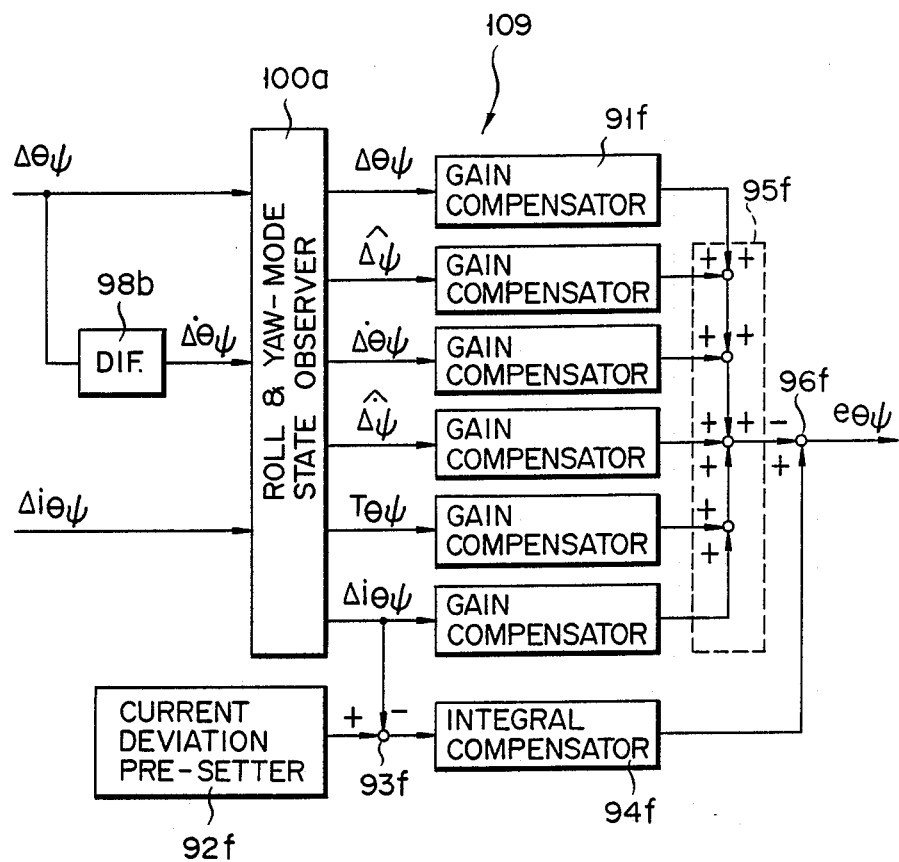
F I G. 20

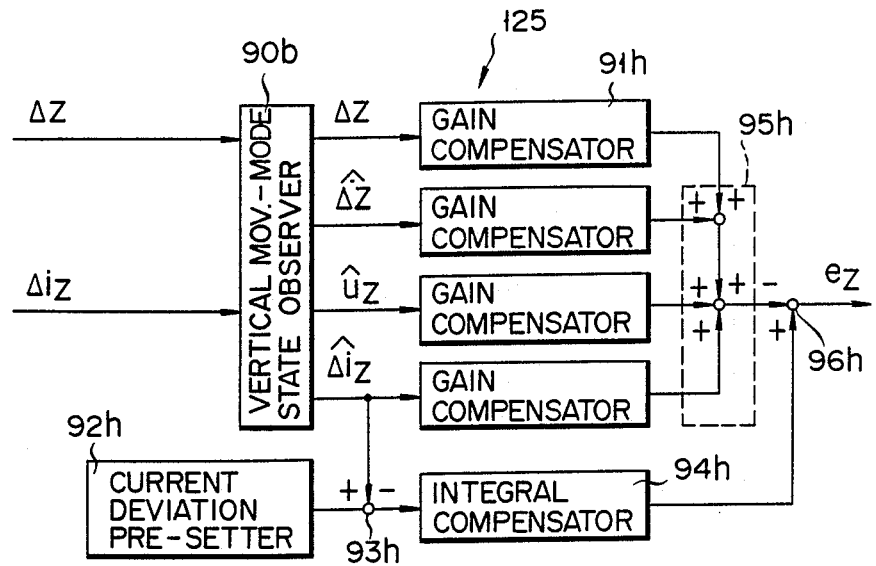
F I G. 24
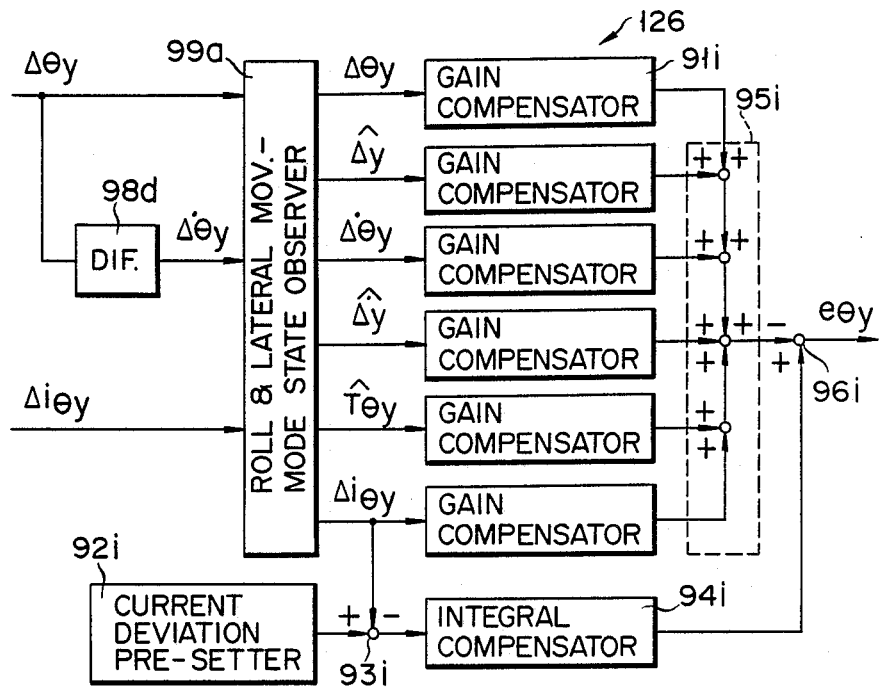
F I G. 25

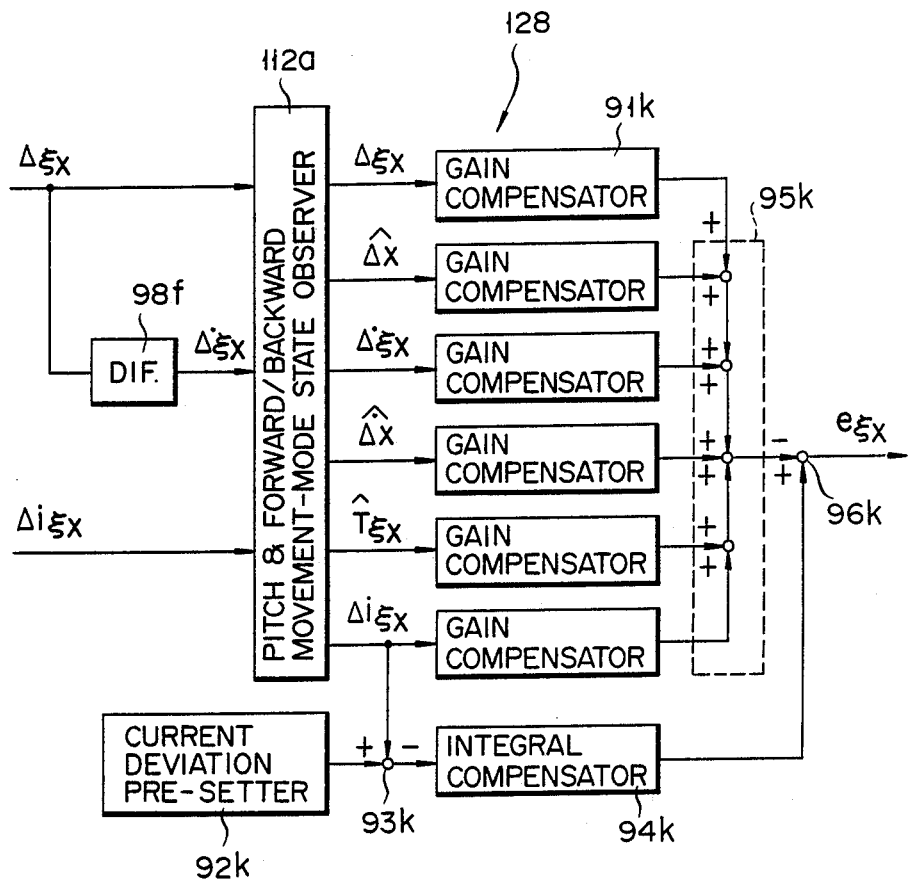
F I G. 27

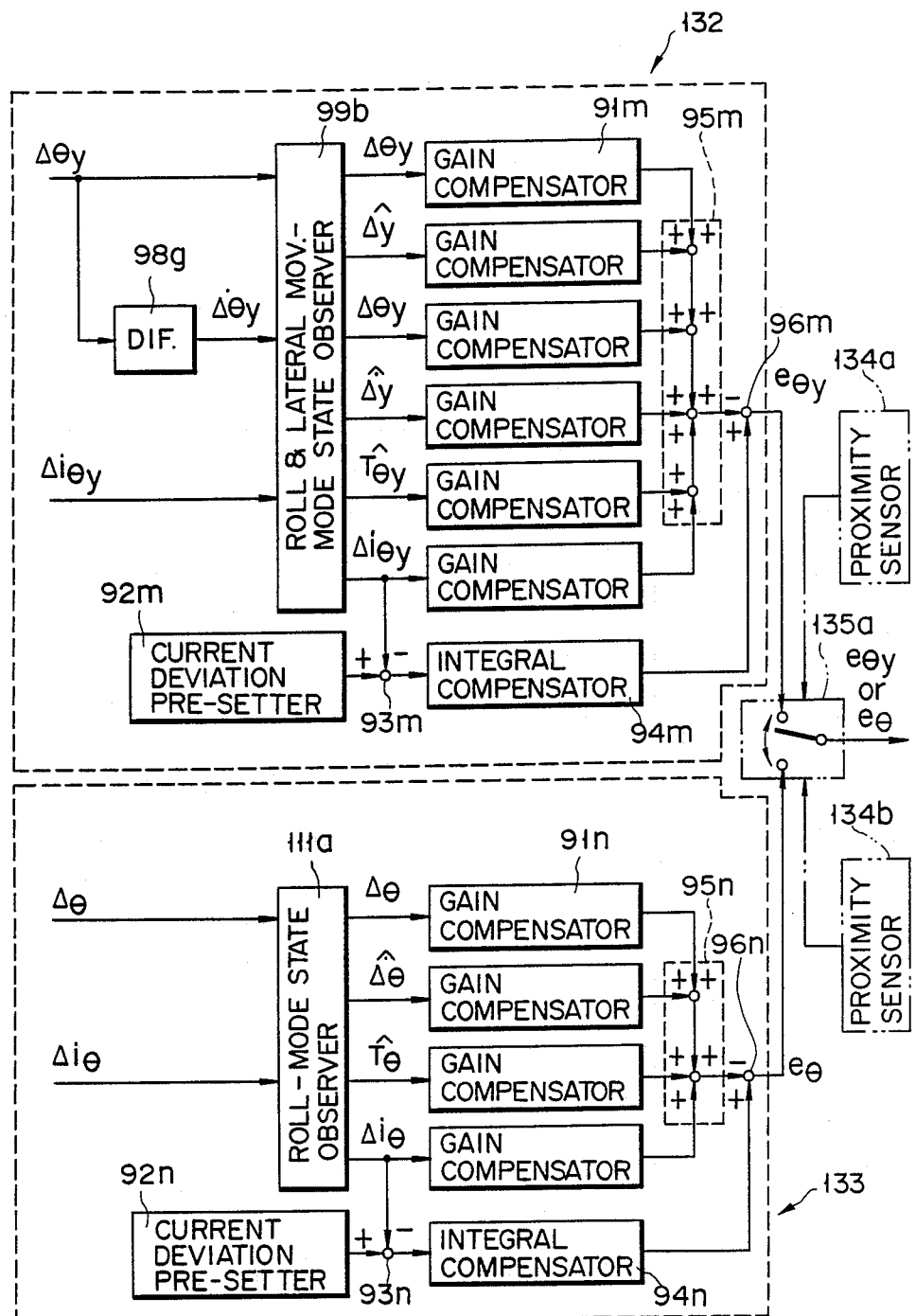
F I G. 30

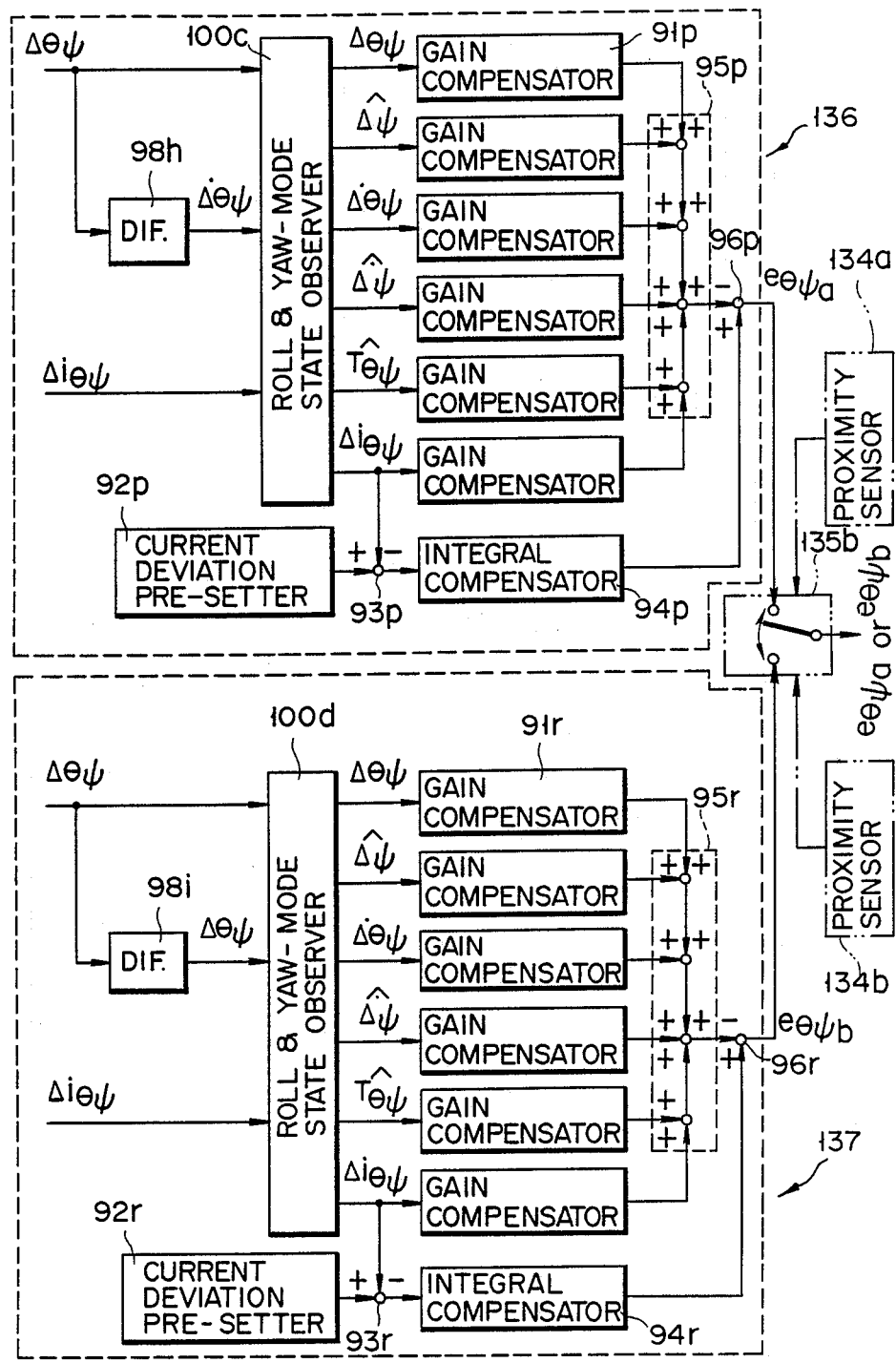
F I G. 31

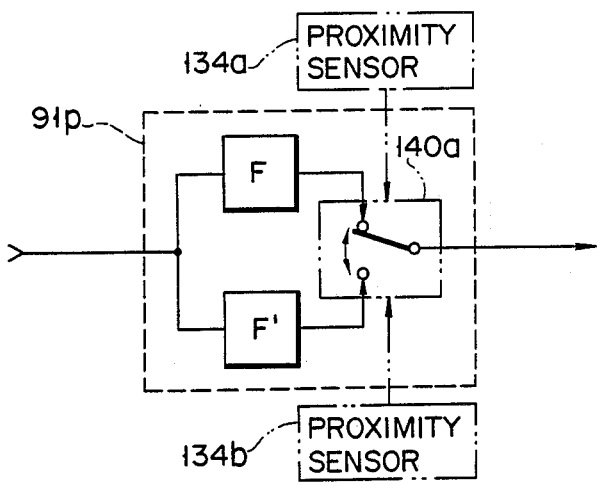
F I G. 33A
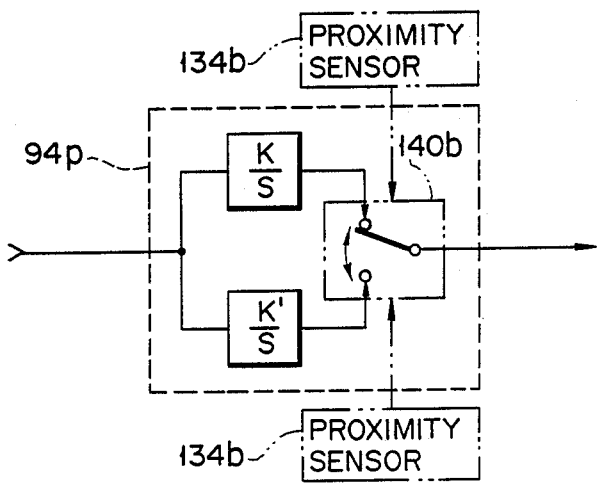
F I G. 33B

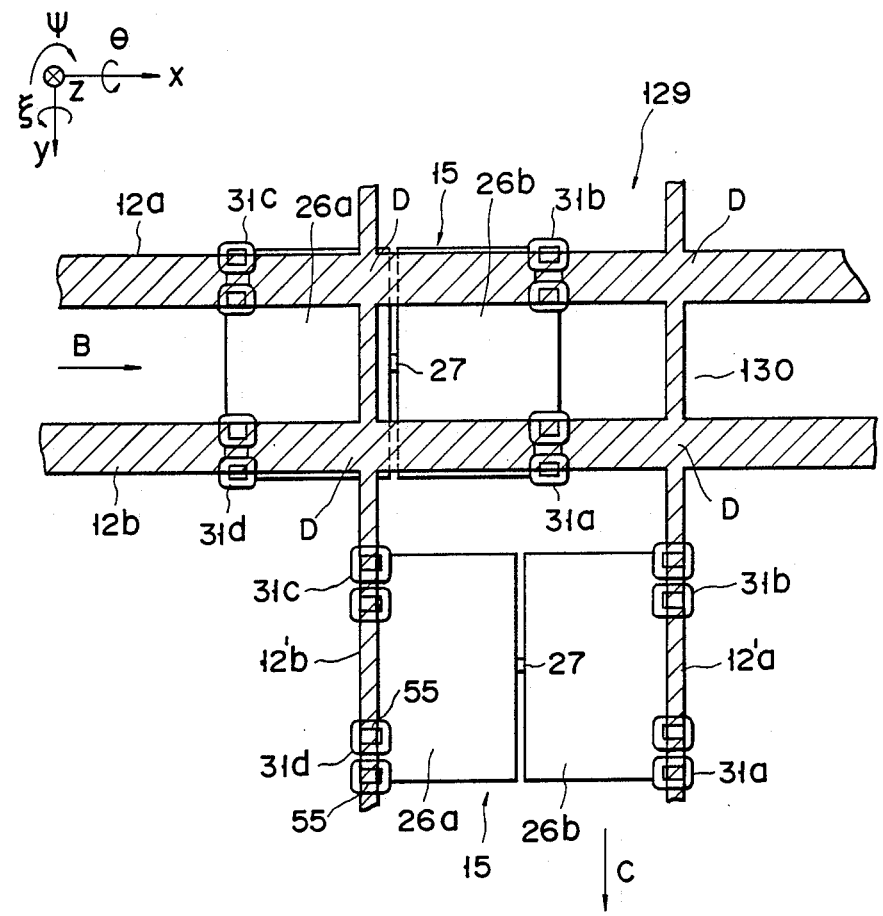
F I G. 34

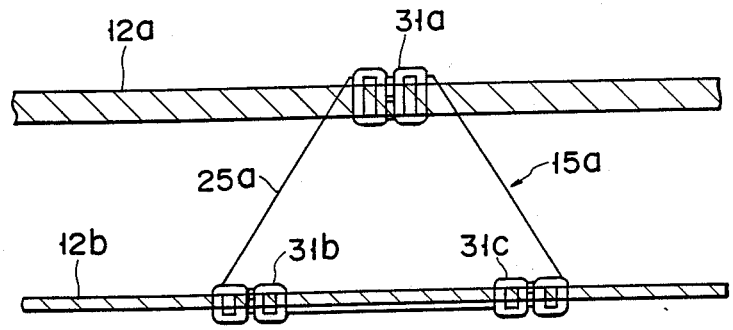
F I G. 35
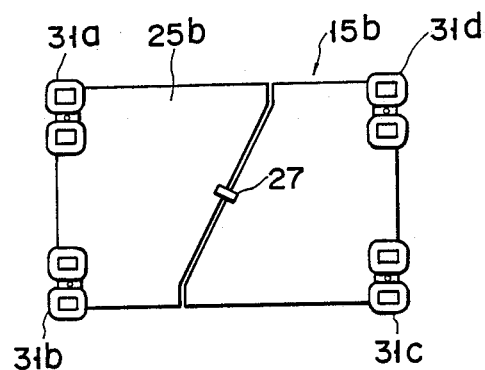
F I G. 36

FIG. 37A
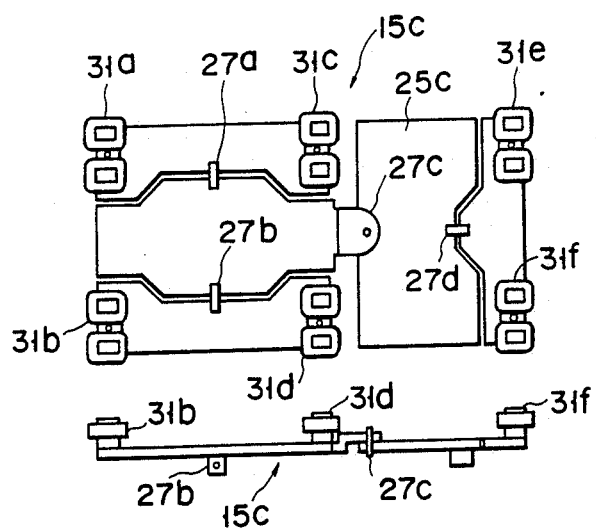
FIG. 37B
FIG. 38A
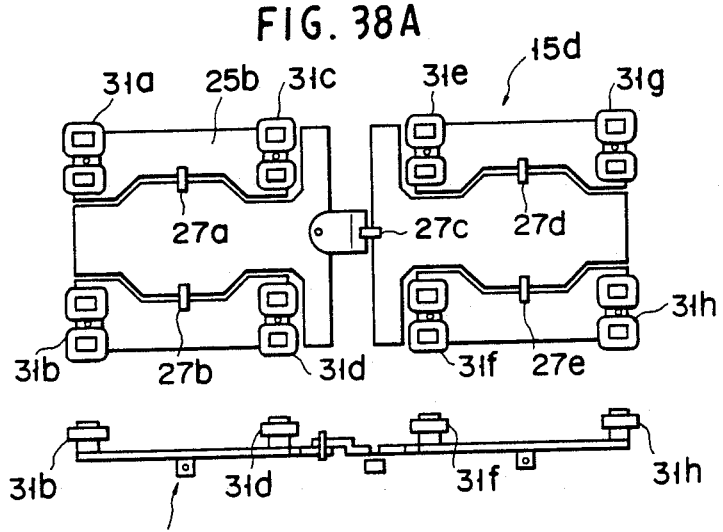
FIG. 38B

ATTRACTION TYPE MAGNETIC LEVITATING APPARATUS

This is a division of application Ser. No. 329,255, filed on Mar. 27, 1989, now U.S. Pat. No. 4,924,778.

BACKGROUND OF THE INVENTION

1. Field of the Invention

The present invention relates to an attraction type magnetic levitating apparatus for supporting and guiding a levitated object by utilizing magnetic attraction and, more particularly, to an attraction type magnetic levitating apparatus wherein the number of electromagnets required to support and guide a levitated object is decreased to reduce the apparatus in size and weight.

2. Description of the Related Art

Recently, as a part of office automation, a transportation unit is used to move slips, documents, cash, data files, and the like between a plurality of points in a building.

A transportation unit used for such a purpose is required to have a function for quickly and quietly moving an object to be transported. Therefore, according to some transportation units of this type, a transportation vehicle is supported on a guide rail in a noncontact state, and is caused to travel in this state. Of such transportation units, a unit which uses an attraction type magnetic levitating apparatus for magnetically supporting a transportation vehicle as a levitated object in a noncontact state is excellent in tracking characteristics and in prevention of noise and dust.

When a levitated object is to be supported by using an attraction type magnetic levitating apparatus, it is important how to suppress rolling and yawing of the levitated object and to maintain a magnetically stable levitated state when the levitated object receives a lateral external force, i.e., an external force in a guiding direction perpendicular to a levitating direction while, e.g., the object passes through a curved portion of a guide rail.

For this reason, in a conventional attraction type magnetic levitating apparatus such as disclosed in "Int. Conf. on MAGLEV & LINEAR DRIVES", May. 14–16, 1986, VANCOUVER, B.C., CANADA, a guiding electromagnet is arranged in addition to a levitating electromagnet arranged to oppose a guide rail. This guiding electromagnet is controlled to obtain a required guiding force. According to another conventional apparatus, two electromagnets are arranged at each support point such that these electromagnets are located on both the sides of a guide rail so as to be offset from each other, and are controlled, thereby obtaining supporting and guiding forces without interference between these forces.

The conventional attraction type magnetic levitating apparatus having the above-described arrangement, however, poses the following problem. Since the levitating direction control and the guiding direction control of the levitated object are independently performed, the number of electromagnets is doubled as compared with a case where no guide control is performed, i.e., a large number of electromagnets are required. For this reason, a magnetic support unit constituted by the electromagnets and the levitated object itself are increased in size as well as weight. As a result, a structure, such as guide rails, for supporting the levitated object from the ground must be strengthened in accordance with the increase in weight to be supported, resulting in an increase in size of the overall apparatus.

As described above, in the conventional attraction type magnetic levitating apparatus, since attraction control in the supporting direction and that in the guiding direction are independently performed, the size of the apparatus is increased due to an increase in size and weight of the magnetic support unit and the levitated object itself.

SUMMARY OF THE INVENTION

It is an object of the present invention to provide an attraction type magnetic levitating apparatus which can properly perform attraction control operations in supporting and guiding directions, and can decrease the number of electromagnets required for the control operations so as to reduce the size and weight of the apparatus.

An attraction type magnetic levitating apparatus of the present invention comprises a ferromagnetic guide, a levitated object arranged near the guide, a magnetic support unit arranged on the levitated object so as to oppose the guide through a gap and including an electromagnet, a sensor section for detecting a magnetic state of a magnetic circuit constituted by the electromagnet, the guide, and the gap, and control means for stabilizing the magnetic circuit by controlling an exciting current of the electromagnet on the basis of output from the sensor section, and magnetically levitating the levitated object. The magnetic support unit is arranged to oppose the guide so as to simultaneously generate a supporting force for levitating the levitated object and a guiding force in a direction substantially perpendicular to the supporting direction when the levitated object is magnetically levitated in a stable state. The control means obtains a single or plurality of first physical values required to control the supporting force on the basis of output from the sensor section and a single or plurality of second physical values required to control the guiding force on the basis of output from the sensor section, both values which are associated with the magnetic circuit.

Another attraction type magnetic levitating apparatus of the present invention comprises a ferromagnetic guide, a levitated object arranged near the guide, a magnetic support unit arranged to oppose the guide through a gap and including an electromagnet, a sensor section for detecting a single or plurality of first physical values of a magnetic state of a magnetic circuit constituted by the electromagnet, the guide, and the gap, values which are required to control a supporting force, and control means for stabilizing the magnetic circuit by controlling an exciting current of the electromagnet on the basis of an output from the sensor section, and magnetically levitating the levitated object. The magnetic support unit is arranged to oppose the guide so as to simultaneously generate a supporting force for levitating the levitated object and a guiding force in a direction substantially perpendicular to the supporting direction when the levitated object is magnetically levitated in a stable state. The control means comprises means for calculating a single or plurality of second physical values associated with the magnetic circuit and required to control the guiding force from the single or plurality of the first physical values required to control the supporting force and obtained on the basis of output from the sensor section.

According to the attraction type magnetic levitating apparatuses of the present invention, since the magnetic attraction acting between the ferromagnetic guide and the magnetic unit arranged on the levitated object and including the electromagnet can be decomposed into a vertical force (supporting force) and a lateral force (guiding force), the motion of the levitated object can be controlled by the attraction of the electromagnet represented by a function of an exciting current, a lateral displacement with respect to the ferromagnetic guide and a vertical distance from the electromagnet to the ferromagnetic guide, whether an external force is act on the levitated object, or not. Here, the exciting current of the electromagnet is a function of a rate of change in displacement on the time base, a rate of change in distance on the time base, a rate of change in exciting current on the time base, and an electromagnet exciting voltage.

In the first case, the first physical values, such as a distance, its rate of change on the time base, an exciting current, or a function thereof, required to control the supporting force, and the second physical values, such as a displacement, its rate of change on the time base, an external force acting on the levitated object, or a function thereof, required to control the guiding force are obtained on the basis of output from the sensor section. In the second case, the second physical values, such as a displacement, its rate of change on the time base, an external force acting on the levitated object, or a function thereof, required to control the guiding force are calculated from the first physical values required to control the supporting force and obtained on the basis of output from the sensor section.

An electromagnet exciting voltage is controlled on the basis of these first and second physical values. Therefore, the magnetically levitated state of the levitated object in the supporting and guiding directions can be stably maintained. As a result, supporting and guiding of the levitated object can be realized by using a single electromagnet without an electromagnet for controlling only the guiding force, thereby reducing the size and weight of the apparatus as a whole.

BRIEF DESCRIPTION OF THE DRAWINGS

FIG. 2 is a sectional view showing the apparatus in the direction of the arrow along the line I—I' in FIG. 1;

FIG. 3 is a partially, cutaway side view of the apparatus;

FIG. 4 is a sectional view of a magnetic support unit in the apparatus;

FIG. 5 is a block diagram showing an arrangement of a control unit in the apparatus;

FIGS. 18 to 21 are block diagrams respectively showing an arrangement of control voltage calculating circuits in the control unit in FIG. 17;

FIGS. 24 to 27 are block diagrams respectively showing arrangements of control voltage calculating circuits in the control unit in FIG. 23;

FIGS. 29 to 33 are block diagrams respectively showing arrangements of control voltage calculating circuits of a control unit in the attraction type magnetic levitating apparatus according to the fifth embodiment in FIG. 28;

FIG. 34 is a view for explaining a modification of the fifth embodiment; and

FIGS. 35 to 42 are views for explaining various modifications of the present invention.

DETAILED DESCRIPTION OF THE PREFERRED EMBODIMENTS

Figure 1:
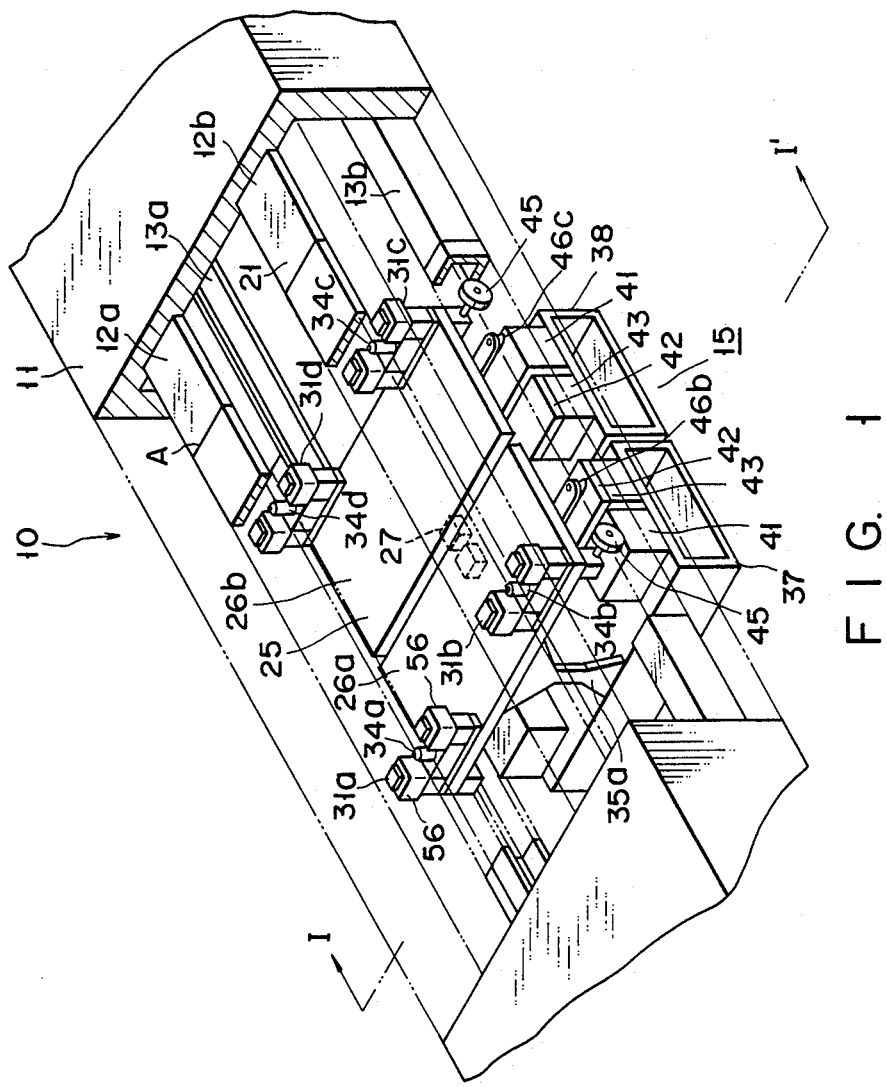
FIG. 1 is a partially cutaway perspective view showing part of an attraction type magnetic levitating apparatus according to a first embodiment of the present invention.

FIGS. 1 to 4 show a schematic arrangement of a levitation type transportation apparatus as a first embodiment of an attraction type magnetic levitating apparatus of the present invention.

Referring to FIGS. 1 to 4, reference numeral 11 denote a track frame having an inverted U-shaped section which is constructed in, e.g., a space of an office so as to evade obstacles. Two guide rails 12a and 12b are installed parallel on the lower surface of the upper wall of the track frame 11. Emergency guides 13a and 13b each having U-shaped section are arranged on the inner surfaces of the side walls of the track frame 11 such that their open sides oppose each other. A levitated object 15 is magnetically levitated below the guide rails 12a and 12b so as to freely travel therealong.

As shown in FIGS. 2 and 3, a plurality of stators 16 of a linear induction motor are arranged on the lower surface of the upper wall of the track frame 11 between/along the guide rails 12a and 12b so as to be spaced apart from each other by a predetermined distance. The guide rails 12a and 12b are constituted by flat ferromagnetic members, and have unit structures so as to facilitate installation in an office. A joint portion A of each unit member 21 is subjected to predetermined bonding.

The levitated object 15 is arranged as follows. A flat base 25 is arranged to oppose the lower surfaces of the guide rails 12a and 12b. The base 25 comprises two unit plates 26a and 26b arranged in a traveling direction, and a coupling mechanism 27, constituted by a rotary shaft and a bearing, for coupling the unit plates 26a and 26b so as to allow them to be rotatable in a plane perpendicular to the traveling direction. Magnetic support units 31a to 31d are respectively mounted on the four corners of the upper surface of the base 25.

These magnetic support units 31a to 31d are attached to the upper surface of the base 25 by using bolts 32 and mounting plates 33, as shown in FIG. 2. Optical gap sensors 34a to 34d are respectively arranged near the magnetic support units 31a to 31d so as to respectively detect gap lengths between the units 31a to 31d and the lower surfaces of the guide rails 12a and 12b, i.e., deviations in the levitating direction. In addition, containers 37 and 38 for storing objects to be transported are respectively attached to the lower surfaces of the unit plates 26a and 26b through coupling members 35a, 35b, 36a, and 36b. Four sets of control units 41, constant voltage generators 42, and small-capacity power sources 43 are respectively mounted on the upper surfaces of the containers 37 and 38 so as to control the four magnetic support units 31a to 31d.

Four trailing wheels 45 are respectively arranged at the four corners of the lower surface of the base 25. The trailing wheels 45 serve to vertically support the levitated object 15 in contact with the inner surfaces of the upper or lower walls of the emergency guides 13a and 13b when magnetic forces of the magnetic supports units 31a to 31d can not be controlled. As shown in FIGS. 2 and 3, four optical gap sensors 46a to 46d (the gap sensor 46d is not shown) are respectively mounted on the four corners of the lower surface of the base 25. The sensors 46a to 46d respectively detect deviations between the units 31a to 31d and the guide rails 12a and 12b on the basis of distances from the inner surfaces of the side walls of the emergency guides 13a and 13b to the levitated object 15, i.e., deviations in the guiding direction perpendicular to the traveling direction of the levitated object 15. Note that the base 25 also serves as the secondary conductor of the above-described linear induction motor, and is arranged at a height to oppose the stators 16 through a slight gap during operation of the apparatus.

Since the magnetic support units 31a to 31d have the same arrangement, the unit 31a will be mainly described with reference to FIG. 4. The width of the unit 31a is larger than that of the guide rail 12a. The inner ends of the unit 31a and the guide rail 12a are aligned with each other, whereas the outer end of the unit 31a is located outward from that of the guide rail 12a. More specifically, the unit 31a comprises an electromagnet 51 the inner end of which is aligned with that of the guide rail 12a, an electromagnet 52 the outer end of which is disposed outward from that of the guide rail 12a, and a permanent magnet 53 bridging lower portions of the electromagnets 51 and 52, and is formed into a U-shaped member as a whole. Each of the electromagnets 51 and 52 of the magnetic support unit 31a consists of a ferromagnetic yoke 55 and a coil 56 wound therearound. A length L2 of each magnetic support unit constituted by yokes 55 of the electromagnets 51 and 52 is set to be larger than a width L1 of the guide rail 12a by a predetermined value. The respective coils 56 are connected in series so that magnetic fluxes formed by the electromagnets 51 and 52 are added to each other.

In this manner, the electromagnets 51 and 52 of each magnetic support unit are disposed in a direction perpendicular to the traveling direction of the levitated object 15 so as to oppose the lower surface of the guide rail 12a while the outer end of the electromagnet 52 is located outward from that of the guide rail 12a. With this arrangement, when one of the left unit 31a (31d) and the right unit 31b (31c) shifts to the center of the guide rail, the other moves away from it, so that control in the levitating and guiding directions can be performed by the left and right units 31a (31d) and 31b (31c).

FIG. 5 shows one of the control units 41 as a representative unit, which controls the magnetic support unit 31a. In FIG. 5, lines with arrows indicate signal paths, and lines without arrows indicate power paths. More specifically, the control unit 41 comprises a sensor section 61 for detecting a physical amount representing a magnetomotive force or a magnetic reluctance in a magnetic circuit for the unit 31a, or a change in motion of the levitated object 15, a calculating circuit 62 for calculating power to be supplied to the coil 56 on the basis of an output signal from the sensor section 61, and a power amplifier 63 for supplying power to the coil 56 on the basis of an output signal from the calculating circuit 62.

The sensor section 61 comprises gap sensors 34a and 46a, modulating circuits 64a and 64b for suppressing influences of external noise included in output signals from the optical gap sensors 34a and 46a, and a current detector 65 for detecting the current value of the coil 56.

The calculating circuit 62 is arranged as follows. An output signal generated by the gap sensor 34a in synchronism with an output from the modulating circuit 64a is supplied to the circuit 62 through the circuit 64a. A gap length set value $Z_0$ is subtracted by a subtractor 66a from this signal, and an deviation relative to the gap length set value for the levitation direction, i.e., a physical value associated with a position is obtained. An output from the subtractor 66a is supplied to a feedback gain compensator 68a through a differentiator 67a and to a feedback gain compensator 69a directly. A physical value associated with speed is obtained through the differentiator 67a. In addition, an output signal from the gap sensor 46a is supplied to the calculating circuit 62 through the modulating circuit 64b. A guiding reference value $Y_0$ is subtracted by the subtractor 66b from this signal, and a deviation relative to the gap length set value for the guiding direction is obtained. An output from the subtractor 66b is supplied to a feedback gain compensator 68b through a differentiator 67b and to a feedback gain compensator 69b directly. An output signal from the current detector 65, which represents a physical amount associated with force or acceleration, is supplied to a feedback compensator 70. Furthermore, the output signal from the current detector 65 is subtracted from a "0"-level signal by a subtractor 71, and the resultant output signal is compensated by an integral compensator 72. Output of an adder 73 for adding outputs from the five feedback gain compensators 68a, 68b, 69a, 69b, and 70 described above is subtracted from output of the integral compensator 72 by a subtractor 74. The output signal of the subtractor 74 is supplied to the power amplifier 63. As described above, according to the first embodiment, outputs from the gap sensor 34 for the levitating direction and the gap sensor 46 for the guiding direction are added to each other, and are fed back to the exciting voltage to the electromagnets 51 and 52 of the magnetic support unit 31 through the amplifier 63. As a result, movement of the levitated object 15 in the levitating and guiding directions is controlled by each of the magnetic support units 31a to 31d constructed as shown in FIG. 4.

The constant voltage generator 42 is arranged between the power source 43 and the control unit 41, and always applies a constant voltage to the modulating circuits 64a and 64b, the calculating circuit 62, and the gap sensors 34a and 46a. This constant voltage generator 42 is used to eliminate the output voltage variation in power source 43 due to a load variation that adversely affects the control unit 41. The constant voltage generator 42 comprises a reference voltage generator 75 and a current amplifier 76 for always supplying a required current to the control unit 41 at a constant voltage on the basis of an output signal from the reference voltage generator 75.

An operation of the levitation type transportation apparatus having the above-described arrangement according to the first embodiment will be described below.

While the apparatus is stopped, the trailing wheels 45 of the transportation vehicle 15 are in contact with the lower or upper inner walls of the emergency guides 13a and 13b. When the apparatus is started in this state, the control units 41 causes each of the electromagnets 51 and 52 to generate magnetic fluxes in the same direction as or a direction opposite to that generated by each permanent magnet 53, and at the same time, controls a current to be supplied to each exciting coil 56 so as to maintain the gap lengths between the magnetic support units 31a to 31d and the guide rails 12a to 12b at predetermined lengths (described later), respectively. With this operation, a magnetic circuit through a path, i.e. the permanent magnet 53—the yoke 55—a gap P—the guide rail 12a —a gap P—the yoke 55—the permanent magnet 53, is formed, as FIG. 4. The predetermined gap length of the gap P is maintained to a length where the downward gravity corresponding to the weight of the object (to be supported) including the levitated object is balanced with the upward magnetic attraction which is corresponding to the magnetomotive force of each permanent magnet 53, between the units 31a to 31d and the guide rails 12a and 12b. Each control unit 41 performs exciting current control of the electromagnets 51 and 52 of each of the units 31a to 31d on the basis of an output from the corresponding gap sensor 46. Therefore, while the gap length is stable, no current flows through each coil 56, and so-called zero-power control is performed. Note that the coupling mechanism 27 serves as a so-called independent gap varying mechanism for independently varying the gaps between the units 31a to 31d and the guide rails 12a and 12b.

If the stators 16 of the linear induction motor are energized when the levitated object 15 is located under the stators 16, a thrust from the stators 16 acts on the base 25. As a result, the levitated object 15 starts traveling along the guide rails 12a and 12b in a levitated state. If the stators 16 are disposed before a position at which the levitated object 15 is completely stopped due to the influences of air resistance and the like, the levitated object 15 receives a thrust again, and keeps moving along the guide rails 12a and 12b. This movement is continued to a destination. In this manner, the levitated object 15 can be moved to the destination in a noncontact state.

If an external force acts on the levitated object 15 in a lateral direction perpendicular to the traveling direction when, e.g., the levitated object 15 passes through curved portions of the guide rails 12a and 12b, the following control is performed. The gap sensors 46a to 46d detect deviations in the lateral direction (guiding direction) of the levitated object 15 due to the external force. As a result, the control units 41 for controlling the magnetic support units which are moving away from the center of the guide rail 12a or 12b increase exciting currents of the coils 56 of these magnetic support units, thereby increasing the magnetic attraction. In contrast to this, the control units 41 for controlling the magnetic support units which are approaching the center of the guide rails 12b or 12a decrease exciting currents of the coils 56 of these magnetic support units, thereby decreasing the magnetic attraction. When the unit 31 is located close to the center of the guide rail, the output of the subtractor 66b is positive and when it is located far from the center of the guide rail, it is negative. When the unit 31 approaches the center of the guide rail, the output of the differentiator 67b is positive and when it moves away from it, it is negative. With this operation, when a leftward external force is applied in, e.g., the case shown in FIG. 4, the magnetic support unit 31a (31d) increases the magnetic attraction, and the magnetic support unit 31b (31c) decreases the magnetic attraction. As a result, rightward guiding force acts, and rolling is generated on the base 25 in a clockwise direction. Note that even if lateral motion of the levitated object 15 occurs in the above control, the change amount on the time base of lateral motion is detected by the differentiator 67b, and the detected change amount is fed back to the exciting voltage of the coil 56 through the power amplifier 63. As a result, the lateral motion of the levitated object 15 is suppressed together with rolling, thereby obtaining a stable levitated state again.

In this embodiment, the unit plates 26a and 26b constituting the base 25 of the levitated object 15 are respectively designed to be freely rotated by the coupling mechanism 27 in a vertical plane substantially perpendicular to the traveling direction. Therefore, even if yawing of the levitated object 15 occurs because of the above-described external force, lateral motions of the magnetic support units with respect to the guide rails 12a and 12b can be controlled for each of the unit plates 26a and 26b in the same manner described above. As a result, the yawing of the levitated object 15 is suppressed.

Figure 6:
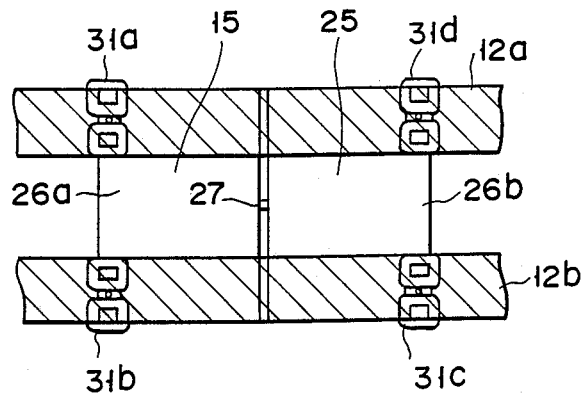
FIGS. 6 to 8 are views showing modifications of the arrangement of the magnetic support unit in the first embodiment.

In the above-described embodiment, the magnetic support units 31a to 31d are arranged such that the yokes 55 respectively oppose the lower surfaces of the guide rails 12a and 12b while parts of the yokes 55 extend outward therefrom. However, the present invention is not limited to this arrangement. For example, as shown in FIG. 6, the units 31a to 31d may be arranged such that their centers are respectively shifted outward or inward from the centers of the guide rails 12a and 12b within the range in which the units 31a to 31d respectively oppose the lower surfaces of the guide rails 12a and 12b.

Figure 7:
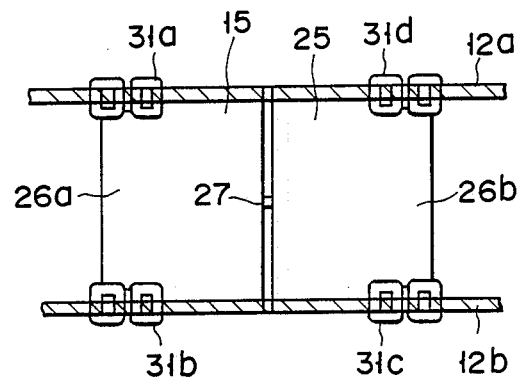

In addition, according to the above-described embodiment, the two electromagnets of each of the magnetic support units 31a to 31d are arranged to be perpendicular to the traveling direction of the levitated object 15. However, as shown in FIG. 7, they may be arranged in the same direction as the traveling direction.

Figure 8:
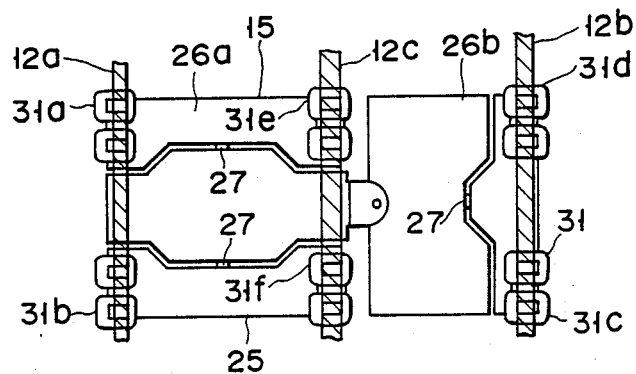

Furthermore, in the above-described embodiment, the levitated object 15 is supported by the two guide rails. However, as shown in FIG. 8, the levitated object 15 may be supported by three guide rails 12a, 12b, and 12c or more.

Moreover, the above-described embodiment is applied to a levitation type transportation apparatus.

However, it can be applied to a levitating type suspending apparatus, e.g., a vibration preventing base, which is adapted to simply suspend/support a levitated object without traveling it.

Figure 9:
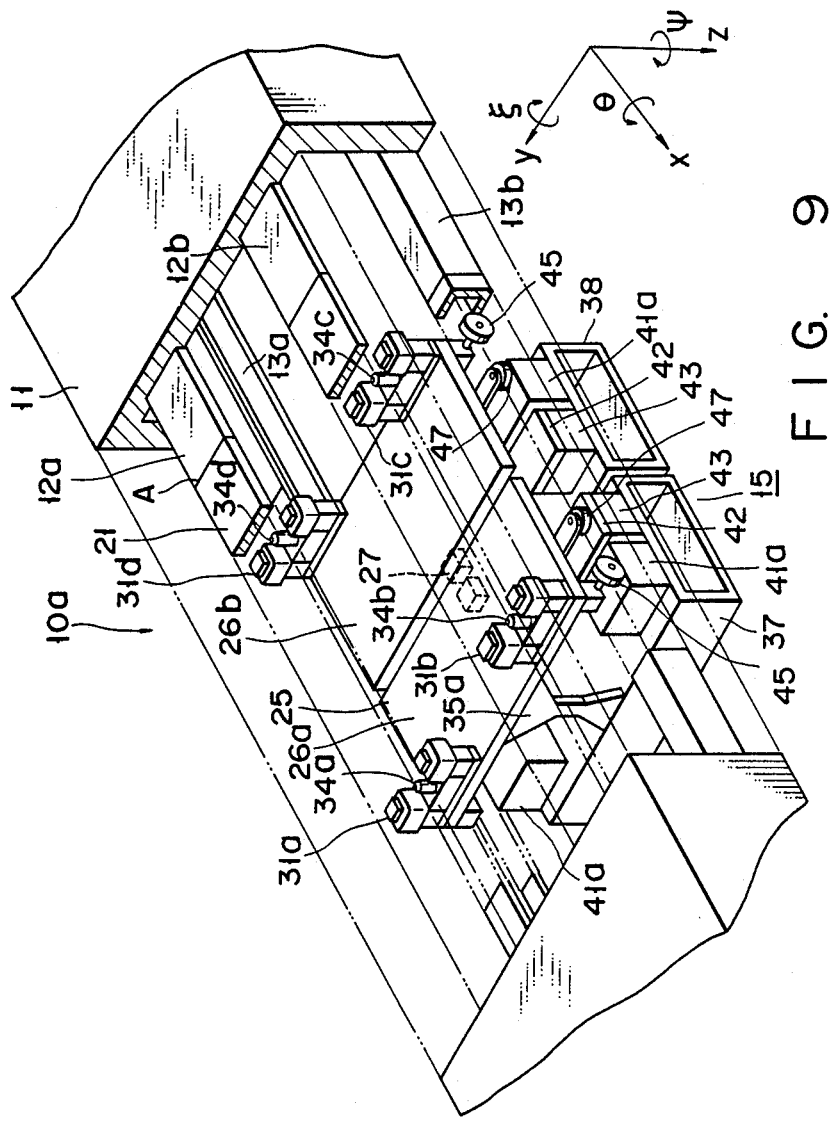
FIG. 9 is a partially cutaway perspective view showing part of an attraction type magnetic levitating apparatus according to a second embodiment of the present invention.

FIG. 9 shows a schematic arrangement of a levitation type transportion apparatus 10a as an attraction type magnetic levitating apparatus according to a second embodiment of the present invention. The same reference numerals are used in FIG. 9 to denote the same parts as in FIG. 1, and a detailed description thereof will be omitted.

In the first embodiment shown in FIGS. 1 to 5, the gap sensors 46a to 46d for detecting deviations in the guiding direction are arranged in addition to the gap sensors 34a to 34d for detecting deviations in the levitating direction so that a guiding force can be controlled by utilizing a deviation and a deviation change amount detected on the basis of outputs from the gap sensors 46a to 46d. In the second embodiment shown in FIG. 9, however, supporting (levitating) and guiding forces are controlled by only using the gap sensors 34a to 34d without arranging the gap sensors 46a to 46d. Therefore, the second embodiment is different from the first embodiment in appearance that the gap sensors 46a to 46d are not present. In addition, in the second embodiment, four side wheels 47 are attached on the four corners of the lower surface of a base 25. When an excessive external force acts on a levitated object 15, the side wheels 47 are brought into contact with the inner surfaces of side walls of emergency guides 13a and 13b so as to laterally support the levitated object 15. The side wheels 47 can be attached to the base 25 in the first embodiment. Other arrangements are the same as those of the first embodiment.

Figure 10:
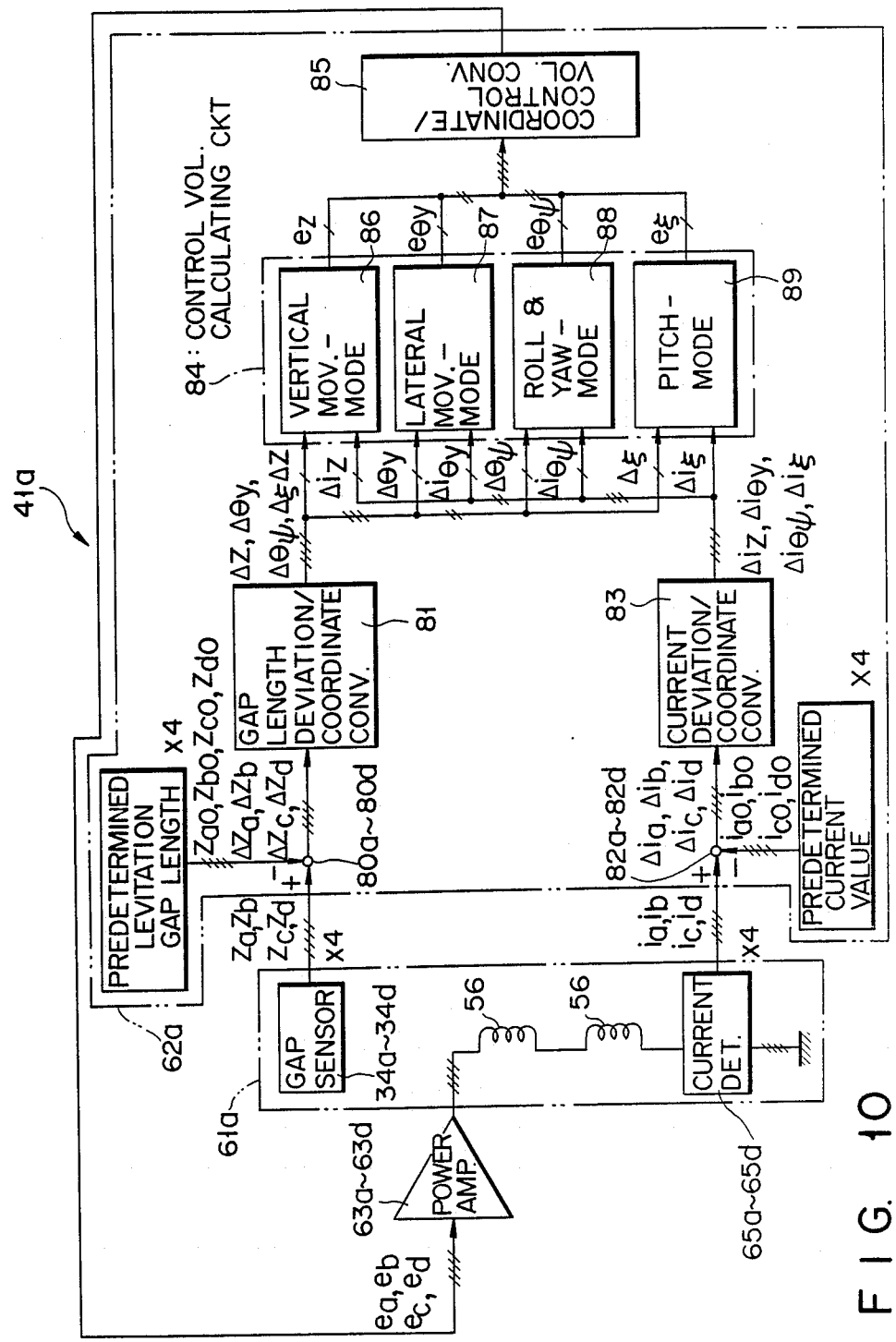
FIG. 10 is a block diagram showing an arrangement of a control unit in the apparatus in FIG. 9.

FIG. 10 shows a control unit 41a of the second embodiment. Referring to FIG. 10, each line with an arrow indicates a signal path, and each line without an arrow indicates a power path near coils 56. Each control unit 41a comprises a sensor section 61a, attached to the levitated object 15, for detecting a magnetomotive force or a magnetic resistance in a magnetic circuit for each of magnetic support units 31a to 31d, or a change in motion of the levitated object 15, a calculating circuit 62a for calculating power to be supplied to each coil 56 on the basis of signals from the sensor section 61a, and power amplifiers 63a to 63d for supplying power to each coil 56 on the basis of signals from the calculating circuit 62a. The control unit 41a controls the four magnetic support units 31a to 31d.

The sensor section 61a comprises the above-described gap sensors 34a to 34d, and current detectors 65a to 65d for respectively detecting the current values of the coils 56.

The calculating circuit 62a performs magnetic levitation control of the levitated object 15 for each motion coordinate shown in FIG. 9. In this case, a magnetic levitation control system associated with the z-coordinate (supporting direction) of the levitated object 15 is a z mode, a magnetic levitation control system associated with a roll ($\theta$ direction) of the levitated object 15 influencing the motion in the y direction (guiding direction) is a $\theta y$ mode, a magnetic levitation control system associated with a roll ($\theta$ direction) of the levitated object 15 influencing the motion in a $\psi$ direction (yawing direction) is a $\theta \psi$ mode, and a magnetic levitation control system associated with a pitch ($\xi$ direction) of the levitated object 15 is a $\xi$ mode.

The calculating circuit 62a comprises: subtractors 80a to 80d for calculating gap length deviation signals $\Delta z_a$ to $\Delta z_d$ by respectively subtracting predetermined gap length values za0 to zd0 from gap length signals $z_a$ to $z_d$ obtained by the gap sensors 34a to 34d; a gap length deviation/coordinate converter 81 for calculating a displacement $\Delta z$ of the center of gravity of the levitated object 15 in the z direction (supporting direction), a sum $\Delta \theta y$ of the rotational angles of the unit plates 26a and 26b in the $\theta$ direction (rolling direction) upon movement of the center of gravity in the y direction (guiding direction), and a difference $\Delta \theta \psi$ in rotational angles between the unit plates 26a and 26b in the $\theta$ direction (rolling direction) upon rotation of the levitated object 15 in the $\psi$ direction (yawing direction) and a rotational angle $\Delta \xi$ of the levitated object 15 in the $\xi$ direction (pitching direction) on the basis of the gap length deviation signals $\Delta z_a$ to $\Delta z_d$; subtractors 82a to 82d for calculating current deviation signals $\Delta i_a$ to $\Delta i_d$ by respectively subtracting predetermined current values ia0 to id0 from exciting current detection signals ia to id obtained by the current detectors 65a to 65d; a current deviation/coordinate converter 83 for calculating a current deviation $\Delta i_z$ associated with the motion of the center of gravity of the levitated object 15 in the z direction, a current deviation $\Delta i_{74\,y}$ associated with the rolling of the unit plates 26a and 26b upon movement of the center of gravity in the y direction, a current deviation $\Delta i_\psi$ associated with the rolling of the unit plates 26a and 26b upon rotation of the levitated object 15 in the $\psi$ direction, and a current deviation $\Delta i_\xi$ associated with the pitching of the levitated object 15 on the basis of the current deviation signals $\Delta i_a$ to $\Delta i_d$; a control voltage calculating circuit 84 for calculating a displacement $\Delta y$ of the levitated object 15 in the y direction, a rotation amount $\Delta \psi$ thereof in the $\psi$ direction, rates of changes $\Delta \dot{y}$ and $\Delta \dot{\psi}$ of the displacement $\Delta y$ and the rotation amount $\Delta \psi$ (reference symbol "." denotes a rate of change on the time base hereinafter), a sum $T\theta y$ of disturbance torques applied to the unit plates 26a and 26b in the $\theta$ direction, and a difference $T_{\theta \psi}$ of the disturbance torques in the $\theta$ direction by receiving the outputs $\Delta z$, $\Delta \theta y$, $\Delta \theta \psi$, $\Delta \xi$, $\Delta i_z$, $\Delta i_{\theta y}$, $\Delta i_{\theta \psi}$, and $\Delta i_\xi$ from the converters 81 and 83, and then calculating electromagnet control voltages $e_z$, $e_{\theta y}$, $e_{\theta \psi}$, and $e_\xi$ for the respective modes for stable magnetic levitation of the levitated object 15 in the z, $\theta y$, $\theta \psi$, and $\xi$ modes; and a coordinate/control voltage converter 85 for calculating electromagnet exciting voltages $e_a$ to $e_d$ to the magnetic support units 31a to 31d on the basis of the outputs $e_z$, $e\theta y$, $e\theta \psi$, and $e\xi$. The calculation results, i.e., the voltages from the circuit 85 are then supplied as $e_a$ to $e_d$ to the power amplifiers 63a to 63d.

The control voltage calculating circuit 84 comprises: a vertical movement mode control voltage calculating circuit 86 for calculating an electromagnet control voltage $e_z$ for the z mode from the outputs $\Delta z$ and $\Delta i_z$; a roll & lateral movement mode control voltage calculating circuit 87 for calculating an electromagnet control voltage $e_{\theta y}$ for the $\theta y$ mode from the outputs $\Delta \theta y$ and $\Delta i_{\theta y}$; a roll & yaw mode control voltage calculating circuit 88 for calculating an electromagnet control voltage $e\theta \psi$ for the $\theta \psi$ mode from the outputs $\Delta \theta \psi$ and $\Delta i_{\theta \psi}$; and a pitch mode control voltage calculating circuit 89 for calculating an electromagnet control voltage $e\xi$ for the $\xi$ mode from the outputs $\Delta \xi$ and $\Delta i_\xi$.

Figure 11:
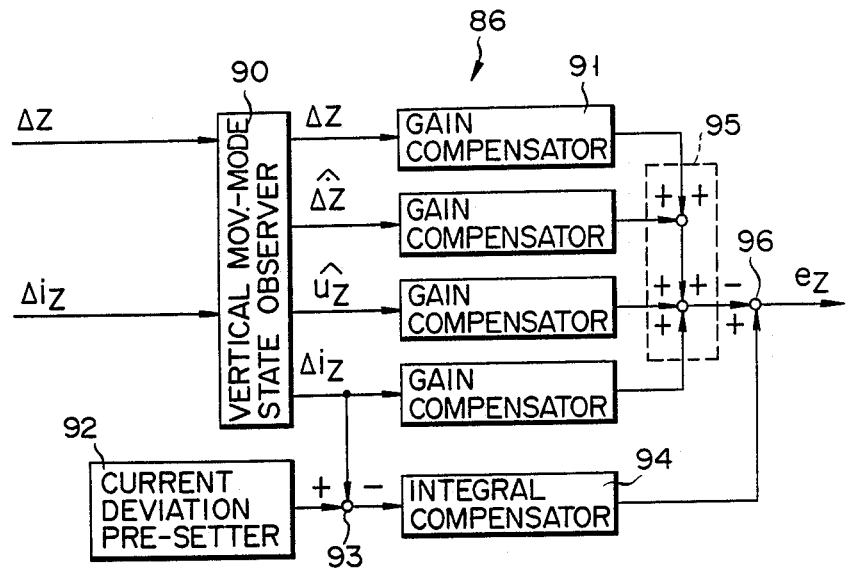
FIGS. 11 to 14 are block diagrams respectively showing arrangements of control voltage calculating circuits in the control unit in FIG. 10.

As shown in FIG. 11, the vertical movement mode control voltage calculating circuit 86 comprises: a vertical movement mode state observer 90 for calculating an estimated value $\hat{\Delta z}$ (reference symbol "^" denotes an estimated value hereinafter) of a rate of change $\hat{\Delta z}$ on the time base from the outputs $\Delta z$ and $\Delta i_z$, and an estimated value $\hat{u}_z$ of an external force $u_z$ in the z mode, on the basis of the fact that the magnetic levitation control system of the z mode has nothing to do with motion of the levitated object 15 in the y and $\psi$ directions; gain compensators 91 for respectively multiplying the values $\Delta z$, $\hat{\Delta z}$, $\hat{u}_z$, and $\Delta i_z$ by proper feedback gains; a current deviation pre-setter 92; a subtractor 93 for subtracting the value $\Delta i_z$ from a target value generated by the pre-setter 92; an integral compensator 94 for integrating an output value from the subtractor 93 and multiplying it by a proper feedback gain; an adder 95 for calculating the summation of output values from the respective gain compensators 91; and a subtractor 96 for subtracting an output value from the adder 95 from an output value from the integral compensator 94 and outputting the electromagnet exciting voltage $e_z$ for the z mode.

Figure 14:
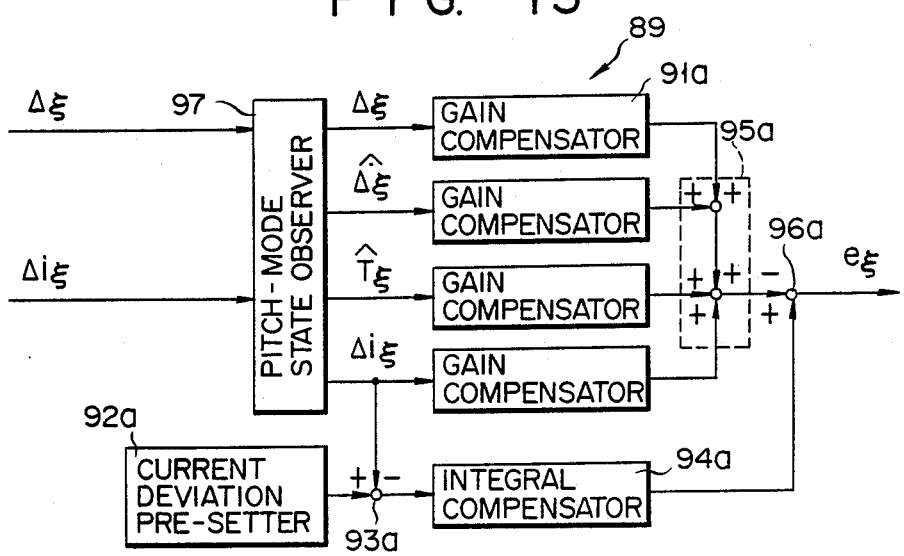

The pitch mode control voltage calculating circuit 89 has an arrangement shown in FIG. 14. Since the magnetic levitation control system of the $\xi$ mode can be considered to have nothing to do with the motion of the levitated object 15 in the y and $\psi$ directions, the pitch mode control voltage calculating circuit 89 has the same arrangement as that of the vertical movement mode control voltage calculating circuit 86. More specifically, the vertical movement mode state observer 90 in the circuit 86 is replaced with a pitch mode state observer 97 for calculating the rotational angle $\hat{\Delta \xi}$ and an external torque estimated value $\hat{T}_\xi$ of the $\xi$ mode from the values $\Delta \xi$, and $\Delta i_\xi$, and other arrangements are the same as those of the circuit 86. Therefore, the same reference numerals in FIG. 14 denote the same parts as in FIG. 11, and a small letter "a" is suffixed to each reference numeral.

Figure 12:
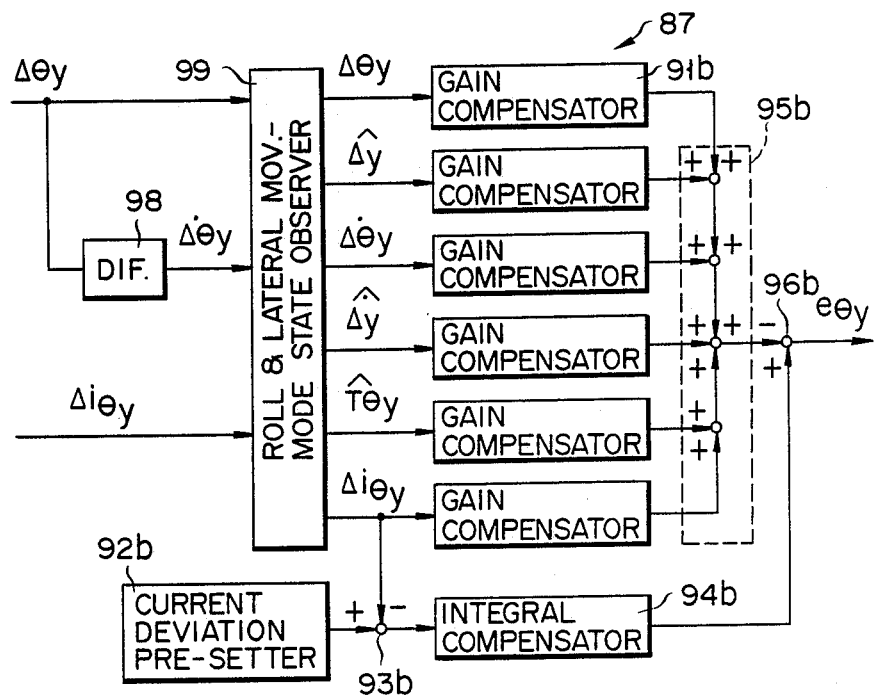

As shown in FIG. 12, the roll & lateral movement mode control voltage calculating circuit 87 comprises: a differentiator 98 for outputting a value $\Delta \dot{\theta} y$ upon differentiation of the value $\Delta \theta y$; a roll & lateral movement mode state observer 99 for calculating values $\hat{\Delta y}$ and $\hat{\Delta \dot{y}}$, and a disturbance torque estimated value $\hat{T}_{\theta y}$ in the $\theta y$ mode on the basis of the values $\Delta \theta y$, $\Delta \dot{\theta} y$, and $\Delta i_{\theta y}$; gain compensators 91b for respectively multiplying $\Delta \theta y$, $\hat{\Delta y}$, $\Delta \dot{\theta} y$, $\hat{\Delta \dot{y}}$, $\hat{T}_{\theta y}$ and $\Delta i_{\theta y}$ by proper feedback gains; a subtractor 93b for subtracting the value $\Delta i_\theta y$ from a target value set by a current deviation pre-setter 92b; an integral compensator 94b for integrating an output value from the subtractor 93b and multiplying it by a proper feedback gain; an adder 95b for calculating the summation of output values from the gain compensators 91b; and a subtractor 96b for subtracting an output value from the adder 95b from an output value from the integral compensator 94b and outputting the electromagnet control voltage $e\theta y$ for the $\theta y$ mode.

Figure 13:
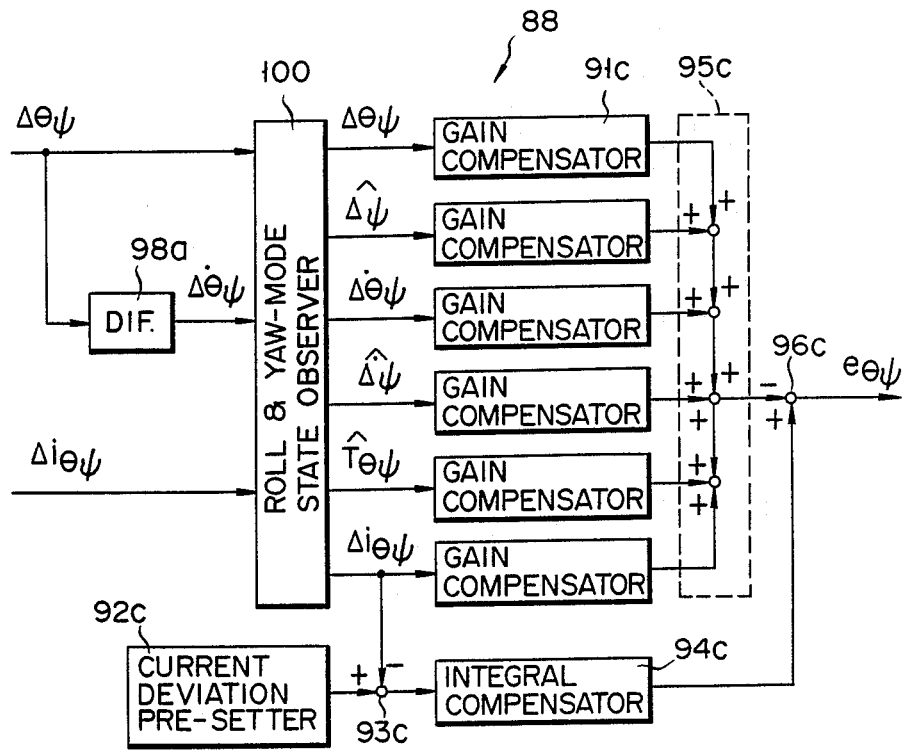

In addition, the roll & yaw mode control voltage calculating circuit 88 has an arrangement shown in FIG. 13. As is apparent from FIG. 13, the circuit 88 has the same arrangement as that of the roll & lateral movement mode control voltage calculating circuit shown in FIG. 12. More specifically, the circuit 88 comprises: a differentiator 98a for outputting a value $\Delta \dot{\theta}_\psi$ upon differentiation of the value $\theta \psi$, a roll & yaw mode state observer 100 for calculating values $\hat{\Delta \psi}$ and $\hat{\Delta \dot{\psi}}$, and a disturbance torque estimated value $\hat{T}_{\theta \psi}$ in the $\theta \psi$ mode on the basis of the values $\Delta \dot{\theta}_\psi$, $\Delta \dot{\theta}_\psi$, and $\Delta i_{\theta \psi}$, gain compensators 91c for respectively multiplying $\Delta \theta \psi$, $\hat{\Delta \psi}$, $\Delta \dot{\theta}_\psi$, $\hat{\Delta \dot{\psi}}$, $\hat{T}_{\theta \psi}$, and $\Delta i_{\theta \psi}$ by proper feedback gains; a subtractor 93c for subtracting the value $\Delta i \theta_\psi$ from a target value set by a current deviation pre-setter 92c; an integral compensator 94c for integrating an output value from the subtractor 93c and multiplying it by a proper feedback gain; an adder 95c for calculating the summation of output values from the gain compensators 91c; and a subtractor 96c for subtracting an output value from the adder 95c from an output value from the integral compensator 94c and outputting the electromagnet control voltage $e\theta_\psi$ for the $\theta_\psi$ mode.

Arrangements of the respective state observers 90, 99, 100, and 97 shown in FIGS. 11 to 14 will be described below. The mass of the levitated object 15 is given as M; inertial moments about the roll axis (x-axis) of the front and rear portions of the levitated object 15 respectively attached to the unit plates 26a and 26b, $I_\theta$; and inertial moments about the yaw axis (z-axis) and pitch axis (y-axis) of the levitated object 15, $I_\psi$ and $I_\xi$. The levitation gap length deviation/coordinate converter 81 performs conversion in accordance with the following equations.

$$\left. \begin{array}{l} \Delta z = (\tfrac{1}{4})(\Delta z_a + \Delta z_b + \Delta z_c + \Delta z_d) \\ \Delta \theta_y = (\Delta z_a - \Delta z_b) + (-\Delta z_c + \Delta z_d) \\ \Delta \theta_\psi = (\Delta z_a - \Delta z_b) - (-\Delta z_c + \Delta z_d) \\ \Delta \xi = -(\tfrac{1}{2})(\Delta z_a + \Delta z_b) + (\tfrac{1}{2})(\Delta z_c + \Delta z_d) \end{array} \right\} \quad (1)$$

Similarly, the current deviation/coordinate converter 83 performs conversion in accordance with the following equations.

$$\left. \begin{array}{l} \Delta i_z = (\tfrac{1}{4})(\Delta i_a + \Delta i_b + \Delta i_c + \Delta i_d) \\ \Delta i_{\theta y} = (\Delta i_a - \Delta i_b) + (-\Delta i_c + \Delta i_d) \\ \Delta i_{\theta \psi} = (\Delta i_a - \Delta i_b) - (-\Delta i_c + \Delta i_d) \\ \Delta \xi = -(\tfrac{1}{2})(\Delta i_a + \Delta i_b) + (\tfrac{1}{2})(\Delta i_c + \Delta i_d) \end{array} \right\} \quad (2)$$

In this case, a linear approximate motion equation of the levitated object 15 and a voltage equation associated with the coil 56 can be given as follows. in the vertical movement mode:

$$\left. \begin{array}{l} M \Delta \ddot{z} = 4(\partial F_z/\partial z)\Delta z + 4(\partial F_z/\partial i)\Delta i_z + u_z \\ L \Delta \dot{i}_z + R \Delta i_z = -N(\partial \phi/\partial z)\Delta \dot{z} - N(\partial \phi/\partial i)\Delta \dot{i}_z + e_z \end{array} \right\} \quad (3)$$

in the roll & lateral movement mode:

$$M\Delta \ddot{y} = (\partial F_y/\partial z)l_\theta \Delta \theta_y + (\partial F_y/\partial i)l_\theta \Delta i_y + 4(\partial F_y/\partial y)\Delta y + U_y$$

$$I_\theta \Delta \ddot{\theta}_y = (\tfrac{1}{2})(\partial F_z/\partial z)l_\theta^2 \Delta \theta_y + (\tfrac{1}{2})(\partial F_z/\partial i)l_\theta^2 \Delta i_y + 2(\partial F_z/\partial y)l_\theta \Delta y + T_{\theta y}$$

$$Ll_\theta \Delta \dot{i}_{\theta y} + Rl_\theta \Delta i_{\theta y} = -N(\partial \phi/\partial z)l_\theta \Delta \dot{\theta}_y - 4N(\partial \phi/\partial y)\Delta \dot{y} - N(\partial \phi/\partial i)l_\theta \Delta \dot{i}_{\theta y} + l_\theta e_{\theta y} \quad (4)$$

$$\theta_y$$

in the roll & yaw mode:

$$I_\psi \Delta \ddot{y} = (\tfrac{1}{2})(\partial F_y/\partial z)l_\xi l_\theta \Delta \theta_\psi + (\tfrac{1}{2})(\partial F_y/\partial i)l_\xi l_\theta \Delta i_\psi + (\partial F_y/\partial y)l_\xi^2 \Delta \psi + T_\psi$$

$$I_\theta \Delta \ddot{\theta}_\psi = (\tfrac{1}{2})(\partial F_z/\partial z)l_\theta^2 \Delta \theta_\psi + (\tfrac{1}{2})(\partial F_z/\partial i)l_\theta^2 \Delta i_{\theta \psi} + (\partial F_z/\partial y)l_\xi l_\theta \Delta \psi + T_{\theta \psi}$$

$$Ll_\theta \Delta \dot{i}_{\theta \psi} + Rl_\theta \Delta i_{\theta \psi} = -N(\partial \phi/\partial z)l_\theta \Delta \dot{\theta}_\psi - 2N(\partial \phi/\partial y)l_\xi \Delta \dot{\psi} - N(\partial \phi/\partial i)l_\theta \Delta \dot{i}_{\theta \psi} + l_\theta e_{\theta \psi} \quad (5)$$

in the pitch mode:

$$I_\xi \Delta \ddot{\xi} = (\partial F_z/\partial z)l_\xi^2 \Delta \xi + (\partial F_z/\partial i)l_\xi^2 \Delta i_\xi + T_\xi$$

$$Ll_\xi \Delta \dot{i}_\xi + Rl_\xi \Delta i_\xi = -N(\partial \phi/\partial z)l_\xi \Delta \dot{\xi} - N(\partial \phi/\partial i)l_\xi \Delta i_\xi + l_\xi e_\xi \quad (6)$$

where $l_\theta$ and $l_\xi$ are distances between the magnetic support units 31a to 31d in directions parallel to the y- and x-axes, respectively, $F_z$ and $F_y$ are attraction forces of the unit 31a in the z-axis direction and attraction of the unit 31a in the y-axis direction, respectively, $\phi$ is a main magnetic flux in a levitation gap shown in FIG. 4, $\partial/\partial h$ (h=z, y, i) is a deviation operator of a function of a variable h, and $(\partial/\partial h)$ is a deviation value of a function at a levitation target state of the levitated object 15, i.e., $Z=Z_0$, $Y=Y_0$, $i=0$. In addition, L and R are a self inductance of a pair of the coils 56 independent of a levitation gap and an electric resistance thereof, respectively, $U_z$ and $U_y$ are external forces parallel to the z- and y-axes, respectively, $T_{\theta y}$, $T_{\theta \psi}$, $T_\xi$, and $T_{104}$ are a sum of disturbance torques about the x-axes of the unit plates 26a and 26b, a difference between the disturbance torques, and disturbance torques around the y- and z-axes of the unit plates 26a and 26b, and a symbol "." represents a first time differential.

In this case, equations (3) and (6) can be combined into one state equation, and equations (4) and (5) can be combined into another state equation. More specifically, if state vectors $X_3$ and $X_5$ are given as $X_3 = (\Delta z, \Delta \dot{z}, \Delta i_z)^T$ or $(\Delta \xi, \Delta \dot{\xi}, \Delta i_\xi)^T$ (where T represents transposition), and $X_5 = (\Delta \theta_y, \Delta y, \Delta \dot{\theta}_y, \Delta \dot{y}, \Delta i_y)^T$ or $(\Delta \theta_\psi, \Delta \psi, \Delta \dot{\theta}_\psi, \Delta \dot{\psi}, \Delta i_{\theta \psi})^T$, two types of state equations can be obtained with respect the state vectors $X_3$ and $X_5$:

$$\dot{X}_3 = A_3 X_3 + B_3 e_3 \circ D_3 D \quad (7)$$

$$\dot{X}_5 = A_5 X_5 + B_5 e_5 \circ D_5 d \quad (8)$$

Where $A_3$, $B_3$, $A_5$, $B_5$, $D_5$ are matrixes:

$$A_3 = \begin{bmatrix} 0 & 1 & 0 \\ a_{210} & 0 & a_{230} \\ 0 & a_{320} & a_{330} \end{bmatrix}$$

$$B_3 = \begin{bmatrix} 0 \\ 0 \\ b_{310} \end{bmatrix}$$

$$D_3 = \begin{bmatrix} 0 \\ d_{210} \\ 0 \end{bmatrix}$$

$$A_5 = \begin{bmatrix} 0 & 1 & 0 & 0 & 0 \\ 0 & 0 & 0 & 1 & 0 \\ a_{31} & a_{32} & 0 & 0 & a_{35} \\ a_{41} & a_{42} & 0 & 0 & a_{45} \\ 0 & 0 & a_{53} & a_{54} & a_{55} \end{bmatrix}$$

$$B_5 = \begin{bmatrix} 0 \\ 0 \\ 0 \\ 0 \\ b_{51} \end{bmatrix}$$

$$D_5 = \begin{bmatrix} 0 & 0 \\ 0 & 0 \\ d_{31} & 0 \\ 0 & d_{42} \\ 0 & 0 \end{bmatrix}$$

$e_3$ and $e_5$ can be respectively given as $e_3 = e_z$ or $e\xi$, and $e_5 = e_{\theta y}$ or $e_{\theta \psi}$, so that d and d' are respectively given as:

$$d = U_z \text{ or } T_\xi, \text{ and } d' = \begin{bmatrix} T_{\theta y} \\ U_y \end{bmatrix} \text{ or } \begin{bmatrix} T_{\theta \psi} \\ T_\psi \end{bmatrix}$$

In addition, the control voltage coordinate/converter 85 performs conversion in accordance with the following equations:

$$e_a = e_z - (\tfrac{1}{4})e_\xi + (\tfrac{1}{4})e_{\theta y} + (\tfrac{1}{4})e_{\theta \psi}$$

$$e_b = e_z - (\tfrac{1}{4})e_\xi - (\tfrac{1}{4})e_{\theta y} - (\tfrac{1}{4})e_{\theta \psi}$$

$$e_c = e_z + (\tfrac{1}{4})e_\xi - (\tfrac{1}{4})e_{\theta y} + (\tfrac{1}{4})e_{\theta \psi}$$

$$e_d = e_z + (\tfrac{1}{4})e_\xi + (\tfrac{1}{4})e_{\theta y} - (\tfrac{1}{4})e_{\theta \psi} \quad (9)$$

The state observers for the respective modes can be arranged according to equations (7) and (8). That is, the z and Δ mode are independent of the motion of the levitated object 15 in the y and ψ directions. Since these modes can be represented by state equation (7) of the same type, these state observers have the same arrangement as that of a state observer disclosed in, e.g., Japanese Patent Application No. 60-146033.

In contrast to this, since physical amounts of the levitated object 15 in the guiding direction must be estimated in the $\theta_y$ and $\theta_{104}$ modes, these state observers have a structure different from that of the observers of the z and Δ modes. However, equations (4) and (5) are transformed into state equation (8) of the same type, state observers having the same arrangement can be used. An arrangement of a state observer for estimating a physical value necessary for guiding force control of a magnetic levitation system in accordance with equation (8) will be described below by exemplifying the roll & lateral movement mode ($\theta_y$ mode) state observer 99.

As a state observer, various types of observers are available, e.g., an same order state observer, a minimum order state observer, and an adaptive observer. In this case, a minimum order state observer having the simplest arrangement is used. Of all physical values required to perform supporting force control, the physical values which can be detected by sensors are input to the state observer in order to minimize its size. More specifically, the state observer 300 has an arrangement shown in FIG. 15, and can be represented by the following equations.

$$Y = CX$$
$$\dot{Z}_{0B} = \hat{A}Z_{0B} + \hat{B}Y$$
$$\hat{X} = \hat{D}Y + \hat{C}Z_{0B}$$
(10)

where X is $X_5$, Y is a physical value, detected by a sensor and is given as $Y = (\Delta\theta_y, \Delta\dot{\theta}_y, \Delta i_{\theta_y})^T$, $Z_{0B}$ is an internal variable of the state observer and is given as $Z_{0B} = (Z_{0B1}, Z_{0B2})$, and $\hat{X}$ is an output from the state observer and is given as $\hat{X} = (\Delta\theta_y, \hat{\Delta}y, \Delta\dot{\theta}_y, \hat{\Delta}\dot{y}, \Delta i_{\theta_y})$. In addition, matrices C, Â, B̂, D̂, and Ĉ have the following arrangements:

$$C = \begin{pmatrix} 1 & 0 & 0 & 0 & 0 \\ 0 & 0 & 1 & 0 & 0 \\ 0 & 0 & 0 & 0 & 1 \end{pmatrix}$$

$$\hat{A} = \begin{pmatrix} -\alpha_1 a_{32} & 1 & -\alpha_1 d_{31} \\ a_{42} - \alpha_2 a_{32} & 0 & -\alpha_2 d_{31} \\ -\alpha_3 a_{32} & 0 & -\alpha_3 d_{31} \end{pmatrix}$$

$$\hat{B} = \begin{pmatrix} -\alpha_1 a_{31} & a_2 - \alpha_1^2 a_{32} - \alpha_1 a_3 d_{31} & -\alpha_1 a_{35} \\ a_{41} - \alpha_2 a_{31} & \alpha_1 a_{42} - \alpha_1 \alpha_2 a_{32} - \alpha_2 \alpha_3 d_{31} & a_{45} - \alpha_2 a_{35} \\ -\alpha_3 a_{31} & -\alpha_1 \alpha_3 a_{32} - \alpha_3^2 d_{31} & -\alpha_3 a_{35} \end{pmatrix}$$

$$\hat{D} = \begin{bmatrix} 1 & 0 & 0 \\ 0 & \alpha_1 & 0 \\ 0 & 1 & 0 \\ 0 & \alpha_2 & 0 \\ 0 & 0 & 1 \\ 0 & \alpha_3 & 0 \end{bmatrix}$$

$$\hat{C} = \begin{bmatrix} 0 & 0 & 0 \\ 1 & 0 & 0 \\ 0 & 0 & 0 \\ 0 & 1 & 0 \\ 0 & 0 & 0 \\ 0 & 0 & 1 \end{bmatrix}$$

where $\alpha_1$, $\alpha_2$, and $\alpha_3$ are parameters of the state observer. The value $\hat{X}$ can be obtained by stabilizing the state observer by properly determining these parameters.

Figure 15:
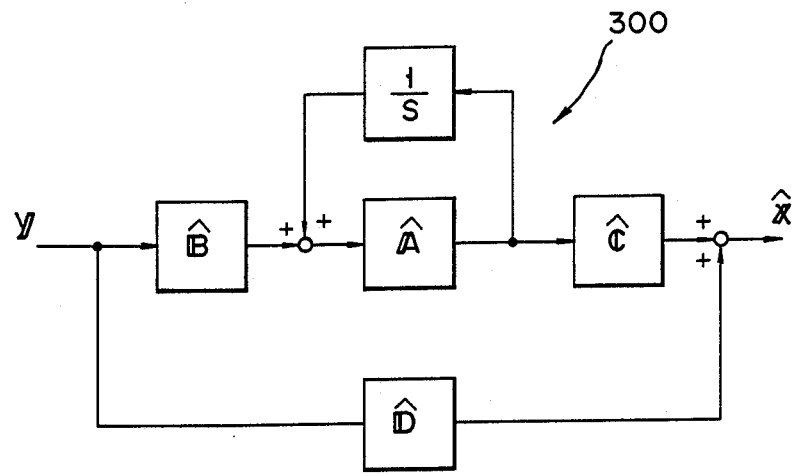
FIG. 15 is a block diagram showing an arrangement of each state observer in the control voltage calculating circuits in FIGS. 11 to 14.

The roll & lateral movement mode observer 99 is realized by using an operational amplifier and the like in accordance with FIG. 15 and equations (10).

An operation of the levitation type transportation apparatus having the above-described arrangement according to the second embodiment will be described below.

While the apparatus is stopped, the trailing wheels 45 are in contact with the lower or upper inner walls of the emergency guides 13a and 13b. When the apparatus is started in this state, the control unit 41a causes the electromagnets 51 and 52 to generate magnetic fluxes in the same direction as or a direction opposite to that generated by each permanent magnet arranged on the magnetic support units 31a to 31d, and at the same time, controls a current to be supplied to each exciting coil 56 so as to maintain the gap lengths between the magnetic support units 31a to 31d and the guide rails 12a to 12b at predetermined lengths, respectively. With this operation, as shown in FIG. 4, a magnetic circuit through a path of the permanent magnet 53—the yoke 55—a gap P—the guide rail 12a (12b)—a gap P—the yoke 55—the permanent magnet 53, is formed with respect to each magnetic support unit.

In this case, if the current values $i_{a0}$ to $i_{d0}$ and outputs from the current deviation pre-setters 92, 92a, 92b, and 92c of the z to ξ modes are set to be zero, the gap length of the gap P is settled in a value so as to balance the weight of the levitated object 15 and, the magnetic attraction between the units 31a to 31d and the guide rails 12a and 12b generated by the electromagnetic force of each permanent magnet 53. At this time, the gap lengths between the units 31a to 31d and the guide rails 12a and 12b are independently kept at the values because of the presence of the coupling mechanism 27. Control unit 41a performs exciting current control of the electromagnets of the units 31a to 31d so as to maintain such gap length, thereby performing so-called zero-power control.

Note that if the stators of the linear induction motor are energized when the levitated object 15 is located immediately under the stators, a thrust from the stators acts on the base 25. As a result, the levitated object 15 starts traveling along the guide rails 12a and 12b in a levitated state. If the stators 16 are disposed before a position at which the levitated object 15 is completely stopped due to the influences of air resistance and the like, the levitated object 15 receives a thrust again, and keeps moving along the guide rails 12a and 12b. Therefore, the levitated object 15 can be moved to a destination in a noncontact state in the same manner as in the first embodiment.

If a force in a direction perpendicular to the traveling direction, i.e., an external force in the guiding direction, acts on the levitated object 15 when, e.g., the levitated object 15 passes through curved portions of the guide rails 12a and 12b, the levitated object 15 tends to be vibrated in the y and $\psi$ directions. According to this embodiment, however, the roll & lateral movement mode state observer 99 and the roll & yaw mode state observer 100 quickly calculate the estimated values $\Delta y$, $\Delta y$, $T_{\psi y}$, $\Delta \dot{i}$, $\Delta \theta$, and $T_{\theta \psi}$ in accordance with changes in $\Delta i_{\theta y}$, $\Delta_{\theta \psi 104}$, $\Delta \theta_\psi$, and $\Delta i_{\theta \psi}$ upon the above vibration. These estimated values are fed back to the electromagnet control voltages ages $e_{\theta y}$ and $e_{\theta \psi}$ of the $\theta y$ and $\theta \psi$ modes, respectively, through the gain compensators 91b and 91c. And then, the control voltages $e_{\theta y}$ and $e_{\theta \psi}$ are respectively converted into the electromagnet exciting currents $e_a$ to $e_d$ of the units 31a to 31d by the coordinate/control voltage converter 85.

Control unit 41a, therefore, excites coils 56 in the following manner. Referring to FIG. 4, of the magnetic support unit 31a to 31d, the attraction of the units moving away from the center of the guide rail 12a or 12b is increased, whereas the attraction of the units approaching the center is decreased. As a result, the vibrations in the levitated object 15 in the y and $\psi$ directions are quickly damped together with independent rolling of the unit plates 26a and 26b with the coupling mechanism serving as an axis, and a stable levitated state is restored.

In the second embodiment, the traveling direction of the levitated object 15 is parallel to the rotation axis of the coupling mechanism 27 for rotating each of the two unit plates 26a and 26b. However, the present invention is not limited to this relationship.

A third embodiment will be described below with reference to FIG. 16. In this embodiment, a levitated object 15 is rotated through 90° in the plane perpendicular to the levitation direction with respect to the levitated object 15 in the first embodiment so as to reverse the traveling and guiding directions, and yokes 55 of magnetic support units 31a to 31d are arranged to oppose guide rails 12a ' and 12b' while the yokes 55 are arranged in the direction of rails 12a ' and 12b'but are shifted outward therefrom. In this case, the horizontal motion of the levitated object 15 in the x direction is associated with its rotating motion in a $\xi$ direction (pitching direction). In addition, the rotational motion of the levitated object 15 in a $\psi$ direction is associated with the rotational motion of two unit plates 26a and 26b in an opposite $\psi$ directions. The rotational direction of the unit plates 26a and 26b of the levitated object 15 in the same 8 direction has nothing to do with the horizontal motion of the levitated object 15 in the y direction.

Figure 17:
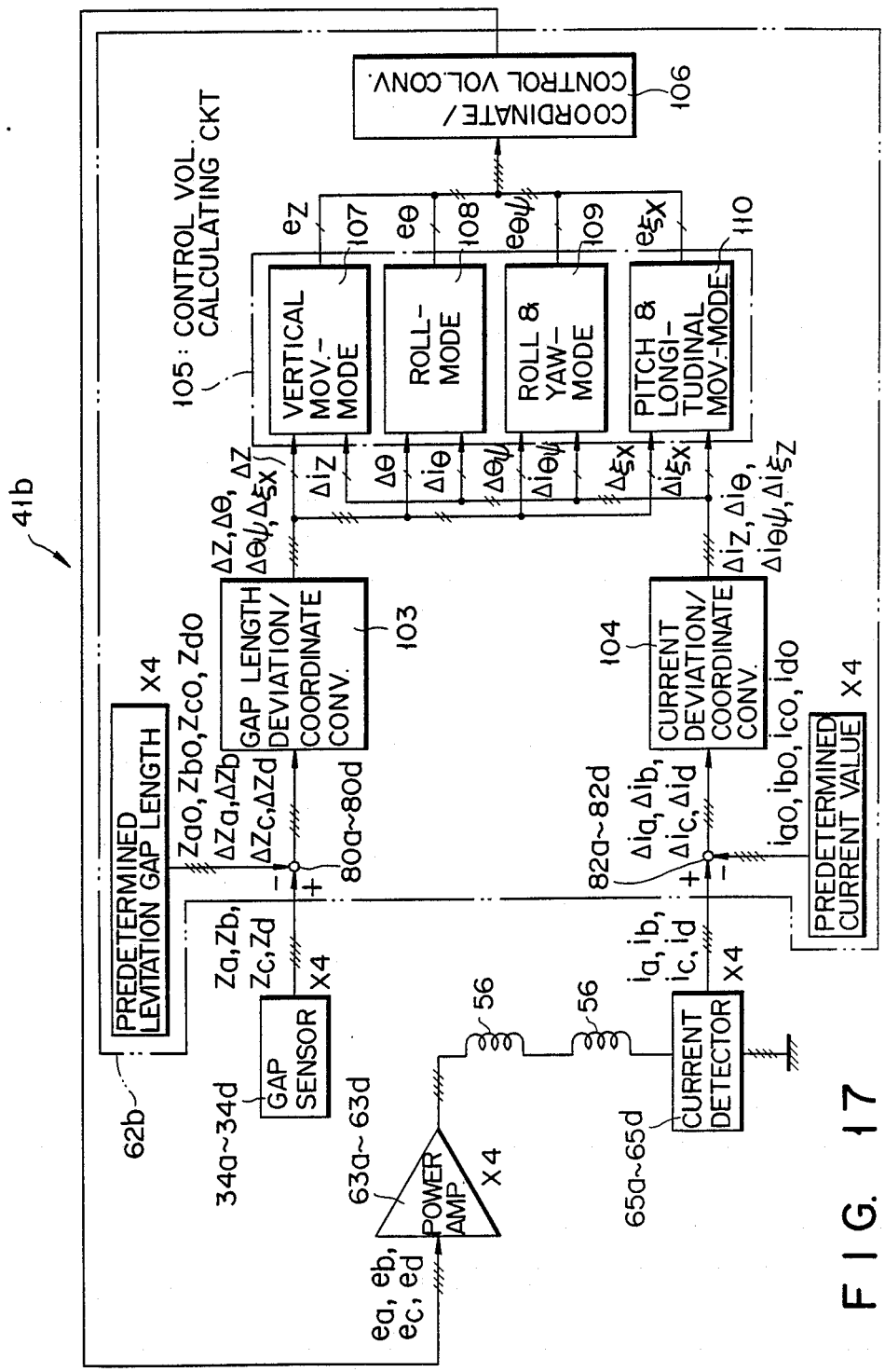
FIG. 17 is a block diagram showing an arrangement of a control unit in the apparatus in FIG. 16.

FIG. 17 shows an arrangement of a control unit 41b according to the third embodiment. In this embodiment, a magnetic levitation controlled system associated with rolling ($\theta$ direction) of the levitated object 15, which is independent of the horizontal motion in the y direction, is set to be a $\theta$ mode, a magnetic levitation controlled system associated with rolling ($\frac{1}{4}$ direction) of the levitated object 15, which influences the motion in the $\psi$direction (yawing direction), is set to be a $\theta_\psi$ mode, and a magnetic levitation control system associated with pitching ($\xi$ direction) of the levitated object 15, which influences the motion in the x direction (guiding direction), is set to be a $\xi_x$ mode. The reference numerals in FIG. 17 denote the same parts as in FIG. 10.

In a calculating circuit 62b, the gap length deviation/coordinate converter 81 is replaced with a gap length deviation/coordinate converter 103. The converter 103 calculates a displacement $\Delta z$ of the center of gravity of the levitated object 15 in a z direction (supporting direction) from gap length deviation signals $\Delta z_a$ to $\Delta z_d$, a sum $\Delta \theta$ of the rotational angles of the unit plates 26a and 26b in the $\theta$ direction (rolling direction), a difference $\Delta \theta \psi$ of the rotational angles of the unit plates 26a and 26b in the $\theta$ direction (rolling direction) upon rotation of the levitated object 15 in the $\psi$ direction (yawing direction), and a rotational angle $\Delta \xi_x$ of the levitated object 15 in the $\xi$ direction (pitching direction) upon movement of the center of gravity of the levitated object 15 in the x direction (guiding direction).

In addition, the current deviation/coordinate converter 83 shown in FIG. 10 is replaced with a current deviation/coordinate converter 104. The converter 104 calculates a current deviation $\Delta i_z$ associated with the motion of the center of gravity of the levitated object 15 in the z direction from current deviation signals $\Delta i_a$ to $\Delta i_d$, a current deviation $\Delta i_\theta$ associated with rolling of the unit plates 26a and 26b of the levitated object 15 in the same direction, a current deviation $\Delta i_{\theta \psi}$ associated with rolling of the unit plates 26a and 26b in the opposite directions upon rotation of the levitated object 15 in the $\psi$direction, and a current deviation $\Delta i_{\xi x}$ associated with pitching of the levitated object 15 upon movement of the center of gravity in the x direction.

In this case, the gap length deviation/coordinate converter 103 and the current deviation/coordinate converter 104 perform calculations in accordance with equations (1) and (2) in which only $\Delta \theta y$, $\Delta \xi$, $\Delta i_{\theta y}$, and $\Delta i_\xi$ are respectively replaced with $\Delta \theta$, $\Delta \xi_x$, $\Delta i_\theta$, and $\Delta i_{\xi x}$. This is because, even if the $\Delta \theta y$ mode of the calculating circuit 62a is replaced with the $\Delta \theta$ mode, and the $\Delta \xi$ mode is replaced with $\Delta \xi x$ mode, physical values detected by gap sensors 34a to 34d and current detectors 65a to 65d are kept unchanged. The motion and voltage equations of the levitated object 15 in this embodiment are replaced with new equations as follows. Of equations (3) to (6), equations (4) are replaced with:

$$I_\theta \ddot{\Delta}\theta = (\tfrac{1}{2})(\partial F_z/\partial z)l_\theta^2 \Delta\theta + (\tfrac{1}{2})(\partial F_z/\partial i)l_\theta^2 \Delta i_\theta + T_\theta \quad (11)$$
$$Ll_\theta \dot{\Delta} i_\theta + Rl_\theta \Delta i_\theta = -N(\partial\phi/\partial z)l_\theta \dot{\Delta}\theta - N(\partial\phi/\partial i)l_\theta \dot{\Delta} i + l_\theta e_\theta$$

equations (6) are replaced with:

$$M\ddot{\Delta} x = -2(\partial F_x/\partial z)l_\xi \Delta\xi - 2(\partial F_x/\partial i)l_\xi \Delta i_{\xi x} + 4(\partial F_x/\partial x)\Delta x + u_x \quad (12)$$
$$I_\xi \ddot{\Delta}\xi_x = (\partial F_z/\partial z)l_\xi^2 \Delta\xi_x + (\partial F_z/\partial i)l_\xi^2 \Delta i_{\xi x} - 2(\partial F_z/\partial x)l_\xi \Delta x + T_{\xi x}$$
$$Ll_\xi \dot{\Delta} i_{\xi x} + Rl_\xi \Delta i_{\xi x} = -N(\partial\phi/\partial z)l_\xi \dot{\Delta}\xi_x + 2N(\partial\phi/\partial x)\dot{\Delta} x - N(\partial\phi/\partial i)l_\xi \dot{\Delta} i_{\xi x} + l_\xi e_{\xi x}$$

and equations (5) are replaced with:

$$I_\psi\Delta\psi = -(\tfrac{1}{2})(\partial F_x/\partial z)l_\theta^2\Delta\theta_\psi - (\tfrac{1}{2})(\partial F_x/\partial i)l_\theta^2\Delta i_{\theta\psi} + (\partial F_x/\partial x)l_\theta^2\Delta\psi + T_\psi$$

$$I_\theta\Delta\theta_\psi = (\tfrac{1}{2})(\partial F_z/\partial z)l_\theta^2\Delta\theta_\psi + (\tfrac{1}{2})(\partial F_z/\partial i)l_\theta^2\Delta i_{\theta\psi} - (\partial F_z/\partial x)l_\theta^2\Delta\psi + T_{\theta\psi}$$

$$Ll_\theta\Delta i_{\theta\psi} + Rl_\theta\Delta i_{\theta\psi} = -N(\partial\phi/\partial z)l_\theta\Delta\theta_\psi + 2N(\partial\phi/\partial x)l_\theta\Delta\psi - N(\partial\phi/\partial i)l_\theta\Delta i_{\theta\psi} + l_\theta e_{\theta\psi}$$ (13)

where $F_x$ represents attractions of the magnetic support unit 31a (31) in the x-axis direction; $u_x$, an external force parallel to the x-axis; $T\theta$ and $T_{\xi x}$, a sum of disturbance torques about the x-axis of the unit plates 26a and 26b and a disturbance torque around the y-axis, respectively. As is apparent from equations (11) to (13), equations (11) can be combined into state equation (7), and equations (13) and (12) are combined into state equation (8).

In this case, $e_3$ and $e_5$ in equations (7) and (8) can be given as $e_3 = e_z =$ or $e_\theta$ and $e_5 = e_{\theta\psi}$, and d or d' are respectively given as:

$$d = u_z \text{ or } T_\theta \text{ and } d' = \begin{bmatrix} T_{\theta\psi} \\ T_\psi \end{bmatrix} \text{ or } \begin{bmatrix} T_{\xi x} \\ u_x \end{bmatrix}$$

In addition, the coordinate/control voltage converter 106 performs a calculation in accordance with equation (9) by replacing $e_\xi$ and $e_{\theta y}$ with $e_{\xi x}$ and $e\theta$, respectively.

The control voltage calculating circuit 84 shown in FIG. 10 is replaced with a control voltage calculating circuit 105. The circuit 105 calculates a displacement $\Delta x$ of the levitated object 15 in the x direction, a rotational amount $\Delta\psi$ thereof in the $\psi$ direction, rates of change $\Delta x$ and $\Delta\psi$ thereof on the time base, a difference $T_{\theta\psi}$ between disturbance torques acting on the unit plates 26a and 26b in the $\theta$ direction, and a disturbance torque $T_{\xi x}$ acting on the levitated object 15 in the $\xi$ direction, on the basis of the outputs $\Delta z$, $\Delta\theta$, $\Delta\theta_\psi$, $\Delta\xi_\chi$, $\Delta i_z$, $\Delta i_\theta$, $\Delta i_{\theta\psi}$, and $\Delta i_{\xi\chi}$ output from the gap length deviation/coordinate converter 103 and the current deviation/coordinate converter 104, and calculating electromagnet control voltages, $e_z$, $e_\theta$, $e_{\theta\psi}$, and $e_{\xi x}$ for the respective modes, i.e., the z, $\theta$, $\theta_\psi$, and $\xi x$ modes, for magnetically levitating the levitated object 15 in a stable state.

Furthermore, the coordinate/control voltage converter 85 shown in FIG. 10 is replaced with a coordinate/control voltage converter 106. The converter 106 calculates electromagnet exciting voltages $e_a$ to $e_d$ for the magnetic support units 31a to 31d, respectively, on the basis of the outputs $e_z$, $e_\theta$, $e_{\theta\psi}$, and $e_{\xi x}$ output from the circuit 105. The calculation results from the converter 106, i.e., the voltages $e_a$ to $e_d$ are then supplied to power amplifiers 63a to 63d, respectively.

The control voltage calculating circuit 105 comprises a vertical movement mode control voltage calculating circuit 107 for calculating an electromagnet exciting voltage $e_z$ of the z mode from the outputs $\Delta z$ and $\Delta i_z$, a roll mode control voltage calculating circuit 108 for calculating an electromagnet exciting voltage $e_\theta$ of the $\theta$ mode from the outputs $\Delta\theta$ and $\Delta i_\theta$, a roll & yaw mode control voltage calculating circuit 109 for calculating an electromagnet exciting voltage $e_{\theta\psi}$ from the outputs $\Delta\theta_\psi$ and $\Delta i_{\theta\psi}$, and a pitch & longitudinal movement mode control voltage calculating circuit 110 for calculating an electromagnet exciting voltage $e_{\xi x}$ of the $\xi x$ mode from the outputs $\Delta\xi_x$ and $\Delta i_{\xi x}$.

The vertical movement mode control voltage calculating circuit 107 has an arrangement shown in FIG. 18. Similar to the vertical movement mode control voltage calculating circuit 86 shown in FIG. 11, the circuit 107 comprises a vertical movement mode state observer 90a, gain compensators 91d, a current deviation pre-setter 92d, a subtractor 93d, an integral compensator 94d, an adder 95d, and a subtractor 96d.

The roll mode control voltage calculating circuit 108 has an arrangement shown in FIG. 19. Since the magnetic levitation control system of the 8 mode is considered to have nothing to do with the motion of the levitated object 15 in the x and $\psi$ directions, the circuit 108 has the same arrangement as that of the vertical movement mode control voltage calculating circuit 107 shown in FIG. 18. More specifically, in the circuit 108, the vertical movement mode state observer 90a of the circuit 107 is replaced with a roll mode state observer 111, and other arrangements are the same as those of the circuit 107. Therefore, the same reference numerals in FIG. 19 denote the same parts as in FIG. 18, and a letter "e" is suffixed to each reference numeral. The observer 111 calculates an estimated value $\hat{\Delta}\theta$ and a disturbance torque estimated value $\hat{T}_u$ of the $\theta$ mode from the values $\Delta\theta$ and $\Delta i_\theta$.

The roll & yaw mode control voltage calculating circuit 109 has an arrangement shown in FIG. 20. As is apparent from FIG. 20, the circuit 109 has the same arrangement as that of the roll & yaw mode control voltage calculating circuit 88 shown in FIG. 13. Therefore, the same reference numerals in FIG. 20 denote the same parts as in FIG. 13, and a letter "f" is suffixed to the each reference numeral.

Figure 21:
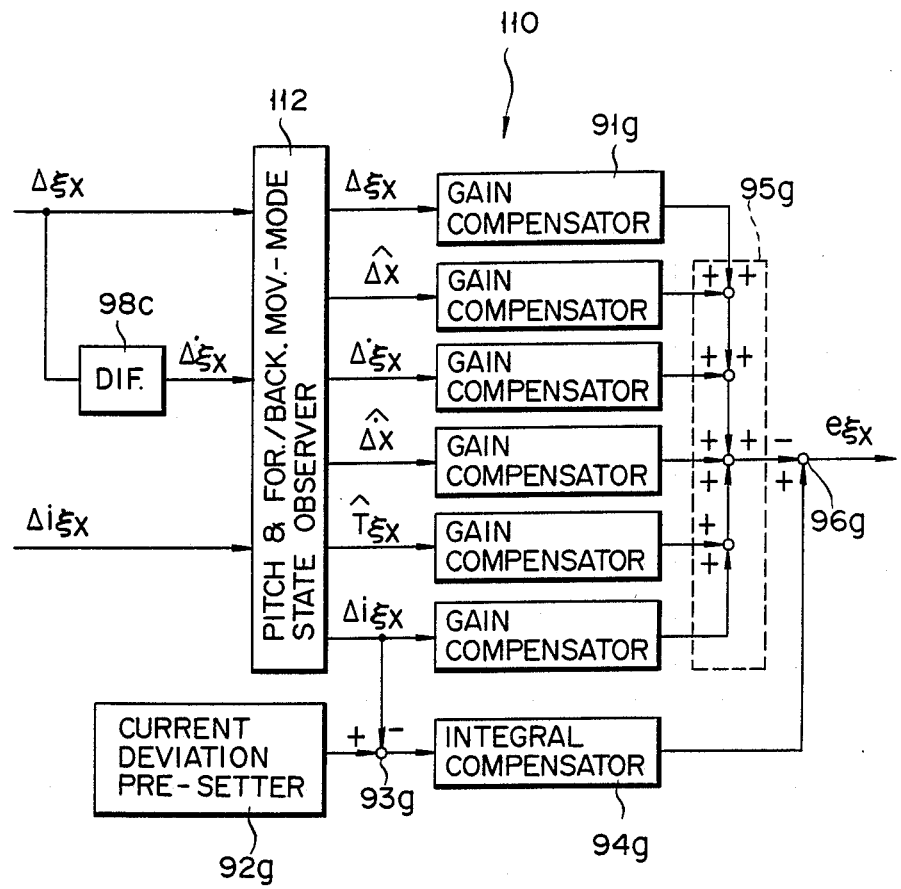

The pitch & longitudinal movement mode control voltage calculating circuit 110 has an arrangement shown in FIG. 21. As is apparent from FIG. 21, the circuit 110 has the same arrangement as that of the roll & yaw mode control voltage calculating circuit 109. More specifically, the circuit 110 comprises a differentiator 98c for differentiating the value $\Delta\xi x$ and outputting a value $\Delta\dot\xi_x$, a pitch & longitudinal movement mode state observer 112 for calculating estimated values $\hat{\Delta} x$ and $\hat{\Delta} \dot x$ and a disturbance torque estimated value $\hat{T}_{\xi x}$ from the values $\hat{\Delta}\xi_x$, $\Delta\xi_x$, and $\Delta i_{\xi x}$, gain compensators 91g for multiplying the values $\hat{\Delta}\xi_x$, $\hat{\Delta}\xi_x\hat{\Delta}\dot x$, $\hat{T}_{\xi x}$, and $\Delta i_{\xi x}$ by proper feedback gains, a subtractor 93g for subtracting the value $\Delta i_{\xi x}$ from a target value set by a current deviation pre-setter 92g, an integral compensator 94g for integrating an output from the subtractor 93g and multiplying it by a proper feedback gain, an adder 95g for calculating a summation of outputs from the gain compensators 91g, and a subtractor 96g for subtracting an output from the adder 95g from an output from the interal compensator 94g and outputting an electromagnet exciting voltage $e_{\xi x}$ of the $\xi x$ mode.

Figure 16:
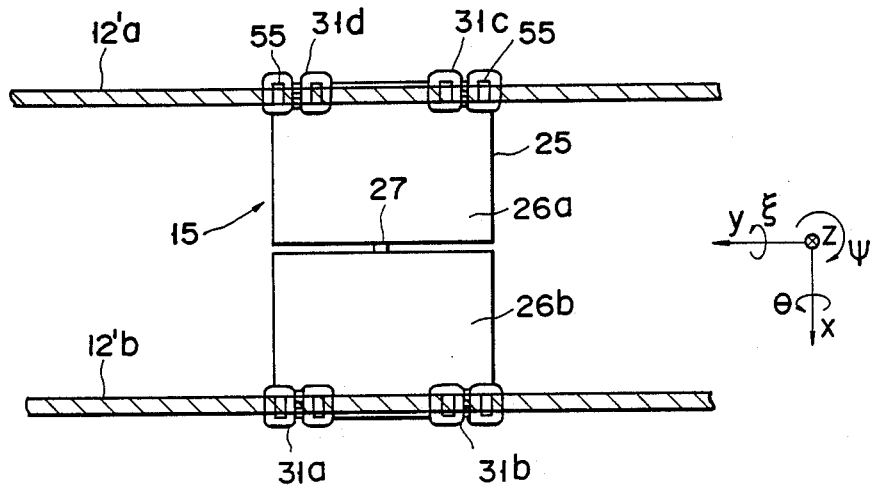
FIG. 16 is a view for explaining a relationship between guide rails and a levitated object in an attraction type magnetic levitating apparatus according to a third embodiment of the present invention.

When the levitated object 15 is caused to travel along the guide rails 12a' and 12b' as shown in FIG. 16, the same effects as in the second embodiment can be obtained by using the control unit 41b having the above-described arrangement.

In the above-described second and third embodiments, the present invention is applied to the levitation type transportation apparatuses which cause the levitated objects 15 to travel along the two ferromagnetic guide rails 12a and 12b, and the two ferromagnetic guide rails 12a' and 12b', respectively. However, the present invention can be applied to the modification described in the first embodiment, and moreover, can be applied to a case wherein the levitated object 15 is simply suspended by magnetic attraction without causing it to travel.

Figure 22:
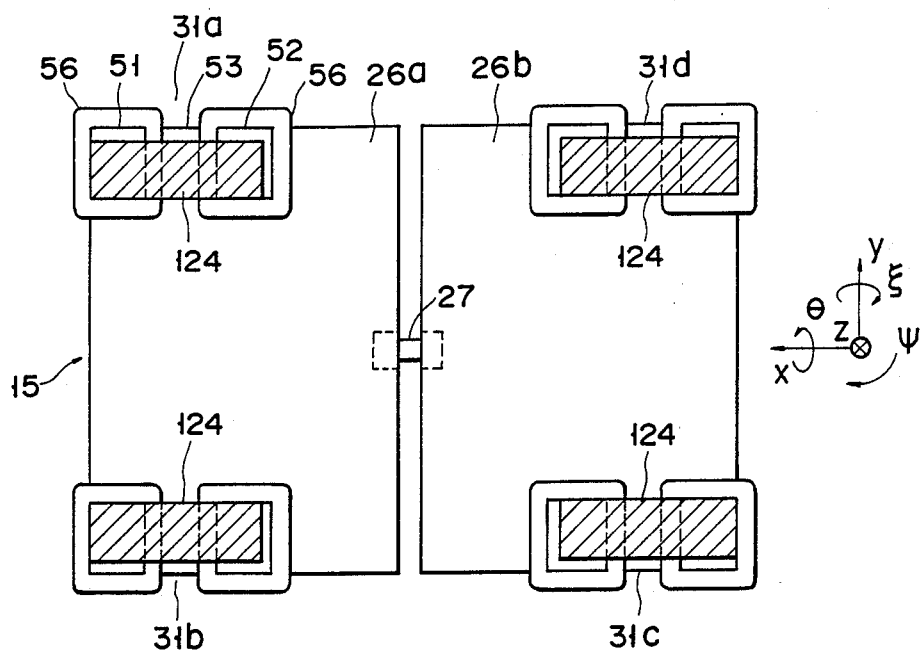
FIG. 22 is a view for explaining a relationship between guides and a levitated object in an attraction type magnetic levitating apparatus according to a fourth embodiment of the present invention.

A fourth embodiment will be described below. As shown in FIG. 22, magnetic support units 31a to 31d are arranged to oppose four ferromagnetic guides 123a to 123d such that when a levitated object 15 rotates in the $\psi$ direction, guiding forces of the units 31a to 31d acting on the object 15 in the x and y directions cause yawings of the object 15 in the same directions. Each of the guides 124a to 124d has a length and a width smaller than those of a rectangular area covering yokes 55 of electromagnets 51 and 52. If the units 31a to 31d are arranged in this manner, since a torque acting on the levitated object 15 in the $\psi$ direction is determined by the sum of guiding forces in the x and y directions, yawing of the object 15 can be effectively damped. In this case, a magnetic levitation controlled system of the levitated object 15 can be divided into z, $\theta y$, $\theta_\psi$, and $\xi_x$ modes.

Figure 23:
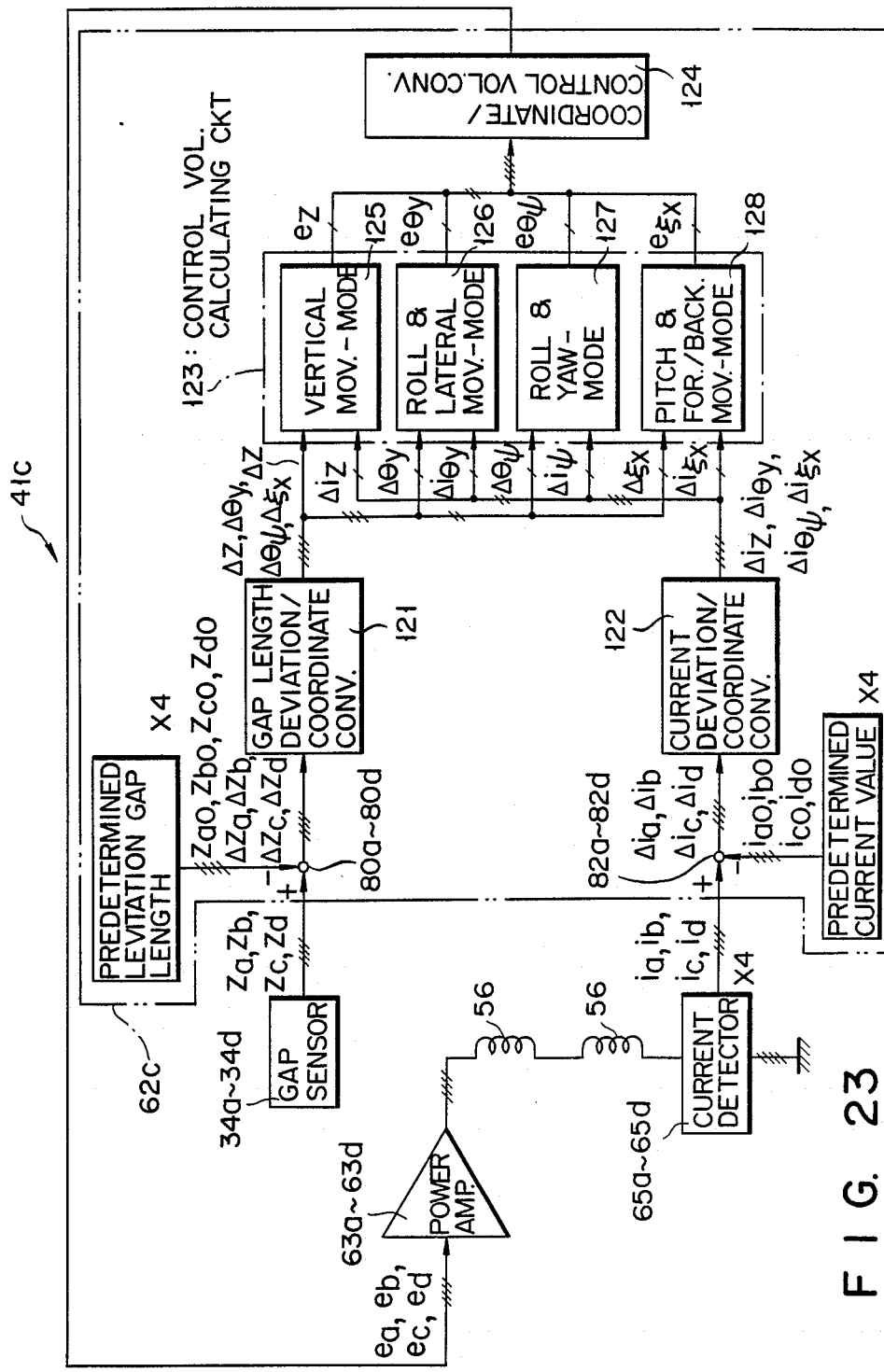
FIG. 23 is a block diagram showing an arrangement of a control unit in the apparatus in FIG. 22.
Figure 26:
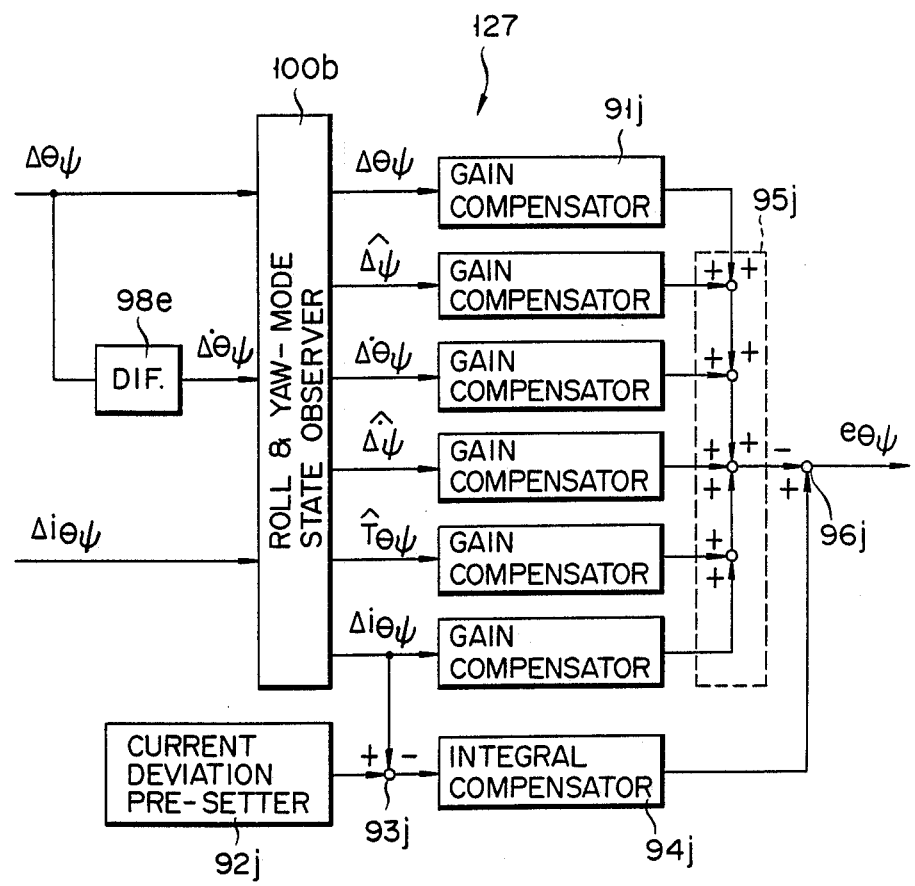

FIG. 23 shows a control unit 41c according to the fourth embodiment. Note that the same reference numerals in FIG. 23 denote the same parts as in FIG. 17. An arrangement of a calculating circuit 62c in the control unit 41c is greatly different from that of the corresponding circuit in the control unit 41b shown in FIG. 17.

More specifically, in the circuit 62c, the gap length deviation/coordinate converter 103 in FIG. 17 is replaced with a gap length deviation/coordinate converter 121. The converter 121 calculates a displacement $\Delta z$ of the center of gravity of the levitated object 15 in the z direction on the basis of gap length deviation signals $\Delta z_a$ to $\Delta z_d$, a sum $\Delta \theta y$ of rotational angles of unit plates 26a and 26b in the direction (rolling direction) upon movement of the center of gravity of the object 15 in the y direction (guiding direction), a difference $\Delta \theta_\psi$ in rotational angles between the unit plates 26a and 26b in the $\theta$ direction (rolling direction) upon rotation of the object 15 in the $\psi$ direction (yawing direction), and a rotational angle $\Delta \xi_x$ of the object 15 in the $\xi$ direction (pitching direction) upon movement of the center of gravity of the object 15 in the $\xi$ direction (guiding direction).

The current deviation/coordinate converter 104 shown in FIG. 17 is replaced with a current deviation/coordinate converter 122. The converter 122 calculates a current deviation $\Delta i_z$ associated with the motion of the center of gravity of the levitated object 15 in the z direction on the basis of current deviation signals $\Delta i_a$ to $\Delta i_d$, a current deviation $\Delta i_{\theta y}$ associated with rolling of the unit plates 26a and 26b in the same direction upon movement of the center of gravity of the object 15 in the y direction, a current deviation $\Delta i_{\theta\psi}$ associated with rollings of the unit plates 26a and 26b in the opposite directions upon rotation of the object 15 in the $\psi$ direction, and a current deviation $\Delta i_{\xi x}$ associated with the pitching of the object 15 upon movement of the center of gravity thereof in the x direction.

The control voltage calculating circuit 105 shown in FIG. 17 is replaced with a control voltage calculating circuit 123. The circuit 123 calculates a displacement $\Delta y$ of the levitated object 15 in the y direction, a rotational amount $\Delta \psi$ of the object 15 in the $\psi$ direction, a displacement $\Delta x$ of the object 15 in the x direction, their rates of change $\Delta \dot{y}$, $\Delta \dot{\psi}$, and $\Delta \dot{x}$ on the time base, a sum $T_{\theta y}$ of disturbance torques acting on the unit plates 26a and 26b in the $\theta$ direction, a difference $T_{\theta\psi}$ between the disturbance torques acting on the unit plates 26a and 26b in the $\theta$ direction, and a disturbance torque $T_{\xi x}$ acting on the object 15 in the $\xi$ direction, on the basis of the outputs $\Delta z$, $\Delta \theta y$, $\Delta \theta_\psi$, $\Delta \xi_x$, $\Delta i_z$, $\Delta i_{\theta y}$, $\Delta i_{\theta\psi}$, and $\Delta i_{\xi x}$ output from the gap length deviation/coordinate converter 121 and the current deviation/coordinate converter 122, and calculates electromagnet control voltages $e_z$, $e_{\theta y}$, $e_{\theta\psi}$, and $e_{\xi x}$ for the respective modes, i.e., the z, $\theta y$, $\theta_\psi$, and $\xi_x$ modes, for magnetically levitating the object 15 in a stable state.

The coordinate/control voltage converter 106 shown in FIG. 17 is replaced with a coordinate/control voltage converter 124. The converter 124 calculates electromagnet exciting voltages $e_a$ to $e_d$ of the magnetic support units 31a to 31d, respectively, on the basis of the outputs $e_z$, $e_{\theta y}$, $e_{\theta\psi}$, and $e_{\xi x}$. The calculation results from the converter 124, i.e., the voltages $e_a$ to $e_d$ are supplied to power amplifiers 63a to 63d.

The control voltage calculating circuit 123 comprises a vertical movement mode control voltage calculating circuit 125 for calculating an electromagnet exciting voltage $e_z$ for the z mode from the values $\Delta z$ and $\Delta i_z$, a roll & lateral movement mode control voltage calculating circuit 126 for calculating an electromagnet exciting voltage $e_{\theta y}$ for the $\theta y$ mode from the values $\Delta \theta y$ and $\Delta i_{\theta y}$, a roll & yaw mode control voltage calculating circuit 127 for calculating an electromagnet exciting voltage $e_{\theta\psi}$ for the $\theta_\psi$ mode from the values $\Delta \theta_\psi$ and $\Delta i_{\theta\psi}$, and a pitch & longitudinal movement mode control voltage calculating circuit 128 for calculating an electromagnet exciting voltage $e_{\xi x}$ for the $\xi_x$ mode from the values $\Delta \xi_x$ and $\Delta i_{\xi x}$. Note that the circuit 125, 126, 127, and 128 have arrangements shown in FIGS. 24 to 27, respectively. The same reference numerals in these drawings denote the same parts as in FIGS. 12, 18, 20, and 21, and reference symbols "h", "i", "j", and "k" are suffixed to the respective reference numerals.

By using the control unit 41c having the above-described arrangement, the levitated state of the levitated object 15 with respect to the guides 123a to 123d can be stabilized in all the coordinate systems shown in FIG. 22.

In the second and third embodiments shown in FIGS. 9 and 16, the traveling direction of each levitated object 15 is fixed to a single direction. However, a fifth embodiment which will be described below can cope with a case wherein the traveling direction of a levitated object 15 is changed through a substantially right angle at a branching portion 130 of a guide rail 129 shown in FIG. 28, which has a structure obtained by crossing the guide rails 12a and 12b shown in FIG. 9 and the guide rails 12a' and 12b' shown in FIG. 16 at right angles. The fifth embodiment can be realized by slightly modifying the second and third embodiments.

More specifically, when the levitated object 15 is to travel in a direction indicated by an arrow B, magnetic levitation control of z, $\theta y$, $\theta_\psi$, and $\xi$ modes of the object 15 can be performed by using the calculating circuit 62a in the second embodiment shown in FIG. 10. When the levitated object 15 is to travel in a direction indicated by an arrow C, magnetic levitation control of the z, $\theta$, $\theta_\psi$, and $\xi_x$ modes of the object 15 can be performed by using the calculating circuit 62b in the third embodiment shown in FIG. 17. In this case, $\Delta\theta$ and $\Delta\theta y$ are physical values representing sums of rotational angles of unit plates 26a and 26b in the $\theta$ direction, and $\Delta\xi$ and $\Delta\xi_x$ are physical values representing rotational angles of the object 15 in the $\xi$ direction. For this reason, gap length deviations $\Delta z_a$, $\Delta z_b$, $\Delta z_c$, and $\Delta z_d$ and current deviations $\Delta i_a$, $\Delta i_b$, $\Delta i_c$, and $\Delta i_d$ are subjected to the same coordinate conversion regardless of the traveling direction of the levitated object 15.

Consequently, electromagnet exciting voltages $e_a$, $e_b$, $e_c$, and $e_d$ can be obtained by applying the same coordinate conversion to the electromagnet control voltages $e_z$, $e_{\theta y}$, $e_\xi$, and $e_\xi$ for the respective modes in FIG. 10 and to the electromagnet control voltages $e_z$, $e_\theta$, $e_{\theta\psi}$, and $e_\xi$ for the respective modes in FIG. 17. That is, the gap length deviation/coordinate converter 81, the current deviation/coordinate converter 83, and the coordinate/control voltage converter 85 in FIG. 10 are equivalent to the gap length deviation/coordinate converter 103, the current deviation/coordinate converter 104, and the coordinate/control voltage converter 106 in FIG. 17, respectively.

For such a reason, if a means for selecting a proper electromagnet control voltage for each mode suitable for a corresponding traveling direction of the levitated object 15 is arranged in the control voltage calculating circuit 84 or 105, magnetic levitation control of the object 15 can be properly performed, whenever the traveling direction is changed.

Figure 32:
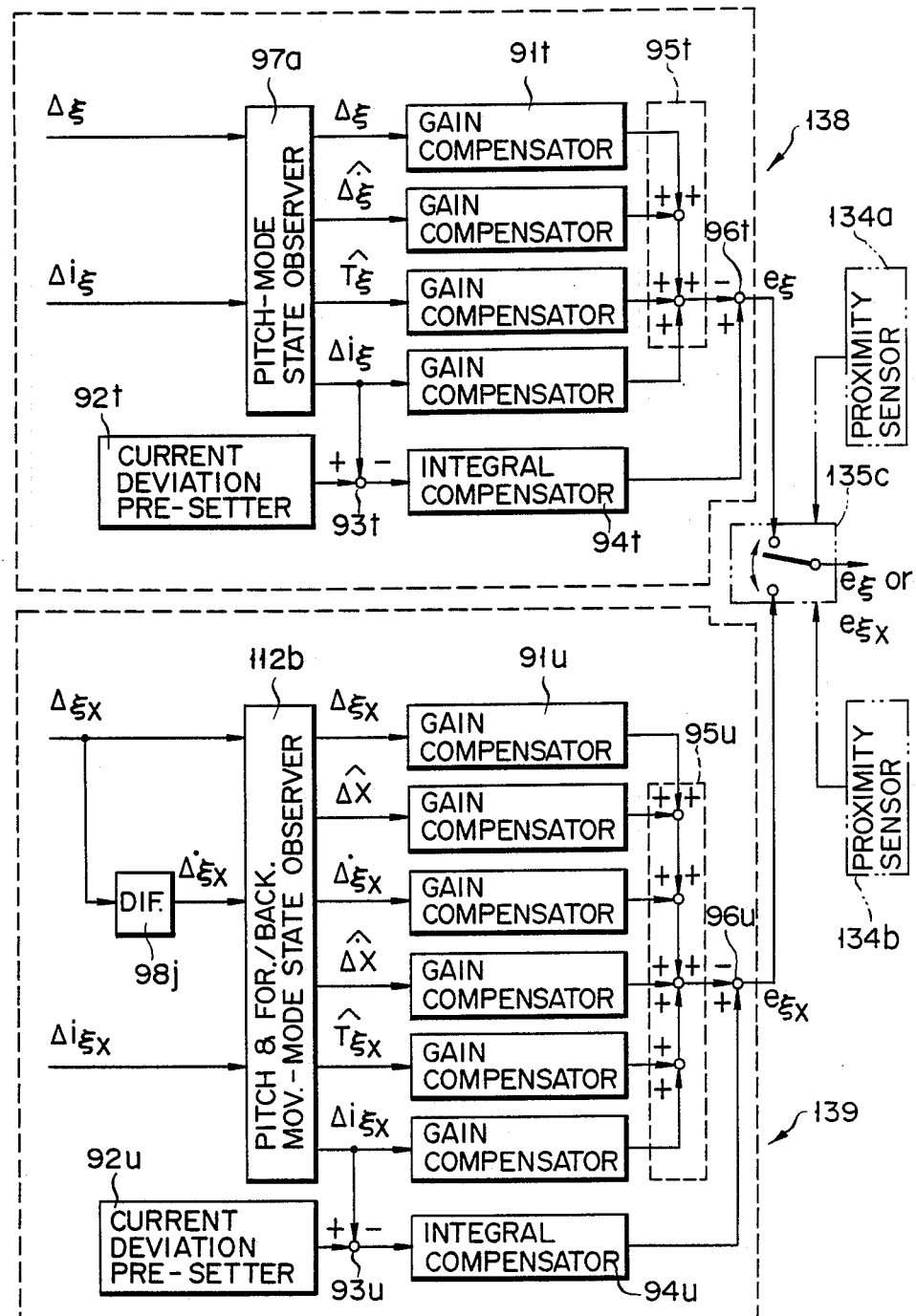

FIGS. 29 to 32 show the respective calculating circuits satisfying the above requirements. A control unit 41 in the fifth embodiment uses a vertical movement mode control voltage calculating circuit 131 shown in FIG. 29 in place of the vertical movement mode control voltage calculating circuit 86 in the control unit 41 in the second embodiment shown in FIG. 10. As shown in FIG. 30, in place of the roll & lateral movement mode control voltage calculating circuit 87 in the second embodiment, the control unit 41 in the fifth embodiment comprises a roll & lateral movement mode control voltage calculating circuit 132, a roll mode control voltage calculating circuit 133, two proximity sensors 134a and 134b, attached to the levitated object 15, for detecting the presence/absence of guide rails 12a and 12b', and a selector 135 for selecting an output from the circuit 132 when the object 15 travels in the direction indicated by the arrow B, and selecting an output from the circuit 133 when the object 15 travels in the direction indicated by the arrow C on the basis of outputs from the proximity sensors 134a and 134b. In place of the roll & yaw mode control voltage calculating circuit 88 in the second embodiment, as shown in FIG. 31, the control unit 41 comprises roll & yaw mode control voltage calculating circuits 136 and 137, and a selector 135b for selecting an output from the circuit 136 for calculating an electromagnet control voltage $e_{\theta\psi a}$ of the $\theta_\psi$ mode when the levitated object 15 travels in the direction indicated by the arrow B, and selecting an output from the circuit 137 for calculating an electromagnet control voltage $e_{\theta\psi b}$ of the $\theta_\psi$ mode when the object 15 travels in the direction indicated by the arrow C on the basis of outputs from the sensors 134a and 134b. In place of the pitch mode control voltage calculating circuit 89 in the second embodiment, as shown in FIG. 32, the control unit 41 comprises a pitch mode control voltage calculating circuit 138, a pitch & longitudinal movement mode control voltage calculating circuit 139, and a selector 135c for selecting an output from the circuit 138 when the object 15 travels in the direction indicated by the arrow B, and selecting an output from the circuit 139 when the object 15 travels in the direction indicated by arrow C on the basis of outputs from the sensors 134a and 134b.

In this case, each gain compensator 91p and an integral compensator 94p of the circuit 136 respectively comprise selectors 140a and 140b so as to select two types of gains F and F', and integrate coefficients K and K' on the basis of detection signals from the proximity sensors 134a and 134b, as shown in FIGS. 33A and 33B.

In the above-described arrangement, when the levitated object 15 travels in the direction indicated by the arrow B, since the proximity sensor 134a detects the guide rail 12a, the control voltage calculating circuit outputs the voltages $e_z$, $e_{\theta y}$, $e_{\theta\psi a}$, and $e_\xi$. When the object 15 travels in the direction indicated by the arrow C, since the proximity sensor 134b detects the guide rail 12b', the control voltage calculating circuit outputs the voltages $e_z$, $e_\theta$, $e_{\theta\psi b}$, and $e_{\xi x}$.

Note that when the levitated object 15 is located at the center of the branching portion 130, cross portions D between the guide rails 12a and 12a', or 12b and 12b' cover most of the upper surfaces of the electromagnets 51 and 52, and hence the guiding forces of the magnetic support units 31a to 31d in the x and y directions are considerably weakened. For this reason, control of guiding forces acting on the levitated object 15 in the x, y and $\psi$ directions cannot be performed.

In this embodiment, however, when the proximity sensors 134a and 134b simultaneously detect the guide rails 12a and 12b', the selector 135a, 135b, and 135c are switched so as to cause the control voltage calculating circuit to output the voltages $e_z$, $e_\theta$, $e_{\theta\psi a}$, and $e_\xi$. At the same time, in the roll & yaw mode control voltage calculating circuit 136, the gains of each gain compensator 91p and the integral compensator 94p are respectively switched to F' and K' by the selectors 140a and 140b. In addition, all the gains F' of the three gain compensators 91p receiving values $\Delta\psi$, $\Delta\dot\psi$, and $T_{\theta\psi}$ estimated by a roll & yaw mode monitor 100c in the roll & yaw mode control voltage calculating circuit 136 are set to zero so as not to perform levitation control of the object 15 in the $\psi$ direction (yawing direction), and the gains F' of other gain compensators 91p receiving values $\Delta\theta_\psi$, $\Delta\dot\theta_\psi$, and $\Delta i_{\theta\psi}$ and the gain K' of compensator 14p are set to be values for stabilizing the rotation of the unit plates 26a and 26b in the opposite directions.

Figure 28:
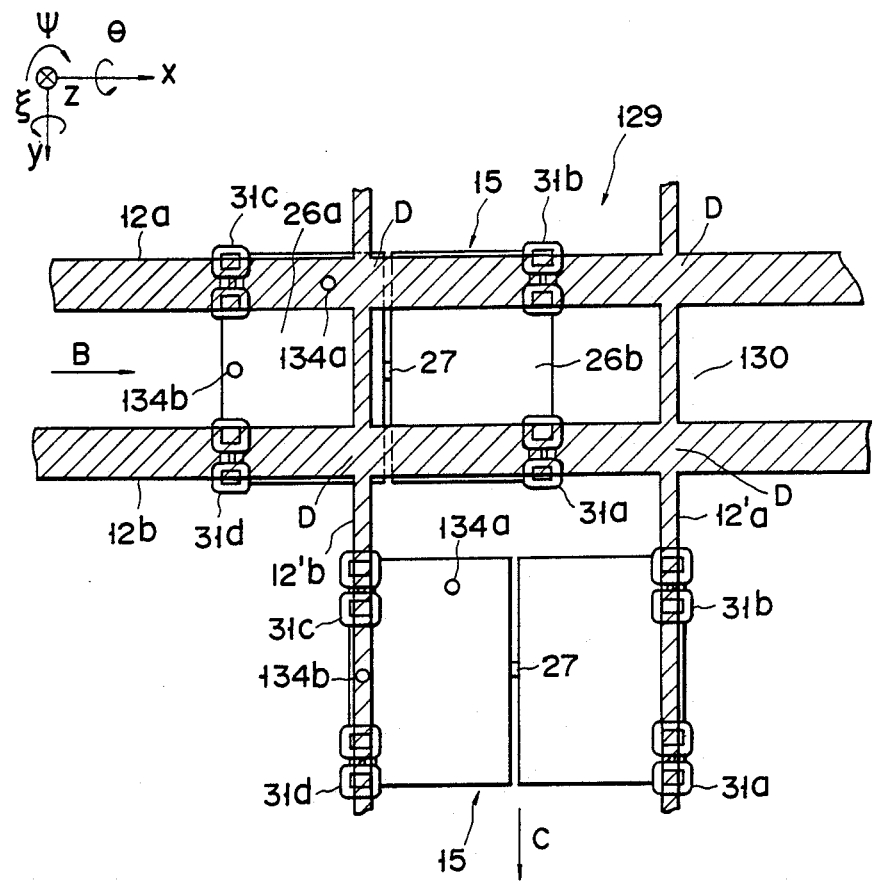
FIG. 28 is a view for explaining a relationship between guide rails and a levitated object in an attraction type magnetic levitating apparatus according to a fifth embodiment of the present invention.
Figure 29:
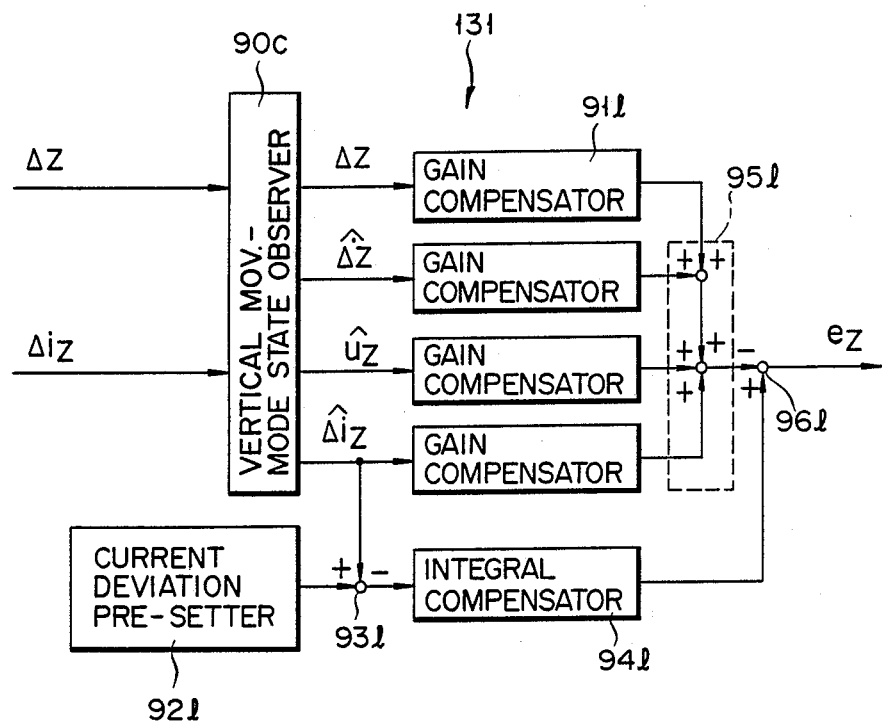

In the case shown in FIG. 28, if a rotational angle difference $\Delta\theta_\psi$ between the unit plates 26a and 26b appears, a torque is applied to the object 15 in the $\psi$ direction while the levitated object 15 travels in the direction indicated by the arrow B, and a torque is applied to the object 15 in the direction opposite to $\psi$ direction while the object 15 travels in the direction indicated by the arrow C. For this reason, the values $\Delta\hat\psi$, $\Delta\hat{\dot\psi}$, $T_{\theta\psi}$ estimated by the observer 100c of the circuit 136, and the values $\Delta\hat\psi$, $\Delta\hat{\dot\psi}$, $T_{\theta\psi}$ estimated by a roll & yaw mode state observer 100d of the circuit 137 represent the opposite directions.

When the distance between the guide rails 12a' and 12b' in the fifth embodiment is increased to be larger than that shown in FIG. 28, and the magnetic support units 31a to 31d are arranged to oppose the guide rails 12a' and 12b' such that yokes 55 are shifted inward therefrom by a predetermined value, even if the rotational angle difference $\Delta\theta_\psi$ between the unit plates 26a and 26b appears, a torque is applied to the levitated object 15 in the $\psi$ direction regardless of the traveling direction (arrows B and C) of the object 15. For this reason, the values $\hat{\Delta\psi}$, $\hat{\Delta\dot\psi}$, $\hat{T}_\theta$ estimated by the observer 100c of the circuit 136, and the values $\hat{\Delta\psi}$, $\hat{\Delta\dot\psi}$, $\hat{T}_\theta$ estimated by the observer 100d of the circuit 137 represent the same direction.

In this case, therefore, if, in the circuit 136, the gains F and K of each gain compensator 91p and the integral compensator 94p are set to stabilize the $\theta$ rotations of the unit plates 26a and 26b in the opposite directions regardless of the traveling direction of the object 15, the circuit 137 and the selector 135b shown in FIG. 31 can be omitted.

Furthermore, in this case, if, in the roll & lateral movement mode control voltage calculating circuit 132 and the pitch & longitudinal movement mode control voltage calculating circuit 139, the gains F and K of gain compensators 91m, 91u and integral compensators 94m, 94u are set to stabilize the rotations of the unit plates 26a and 26b in the same $\theta$ direction, and the rotation of the levitated object 15 in the $\theta$ direction regardless of the traveling direction of the object 15, and if, the gains K and F of the gain compensators 91p and the integral compensator 94p in the circuit 136 are set to stabilize the rotations of the unit plates 26a and 26b in the opposite $\theta$ directions even when the object 15 is located at the center of the branching portion 129, a control voltage calculating circuit having the same arrangement as that of the control voltage calculating circuit 123 shown in FIG. 23 can be employed. That is, the proximity sensors 134a and 134b, the roll mode control voltage calculating circuit 133, the pitch mode control voltage calculating circuit 138, and the selectors 135a, 135b, 135c, 140a, and 140b can be omitted.

By using the control voltage calculating circuit modified in the above-described manner, even if the traveling direction of the levitated object 15 traveling along guide rails is changed through 90°, the magnetically levitated state of the object 15 can be stabilized in all the coordinate systems suitable for its levitation position on the guide rails.

In the above-described embodiments, the base 25 is constituted by the two unit plates 26a and 26b, and the coupling mechanism 27 for coupling the unit plates 26a and 26b so as to allow them to rotate about a rotary shaft parallel or perpendicular to the traveling direction. However, the direction, number, and position of rotational shafts on the base 25 are not specified. An attraction type magnetic levitating apparatus according to the present invention can be variously modified and changed in terms of applications, the shape of an levitated object, the number of magnetic support units, and the like, as shown in FIGS. 35 to 38.

FIG. 35 shows a case wherein a levitated object 15a is levitated by three magnetic support units 31a to 31c. In this case, the levitation gap lengths of the units 31a to 31c can be independently changed without a coupling mechanism having a rotary shaft. Therefore, the base 25a need not incorporate a coupling mechanism.

FIG. 36 shows a case wherein a base 25b comprises a coupling mechanism 27 which can rotate about a rotary shaft slightly tilted with respect to the traveling direction of a levitated object 15b.

FIG. 37 shows a case wherein a levitated object 15c is divided into five unit members, and magnetic support units 31a to 31f are respectively mounted on the unit members in accordance with a relationship shown in FIG. 37 while the units members are coupled to each other through four coupling mechanisms 27a to 27d.

FIG. 38 shows a case wherein a levitated object 15d is divided into six unit members, and magnetic support units 31a to 31h are respectively mounted on the unit members in accordance with a relationship shown in FIG. 38 while the unit members are coupled to each other through five coupling mechanisms 27a to 27e. In FIGS. 35 to 38, each coupling mechanism couples the unit members so as to independently change the levitation gap length of each magnetic support unit.

Figure 39:
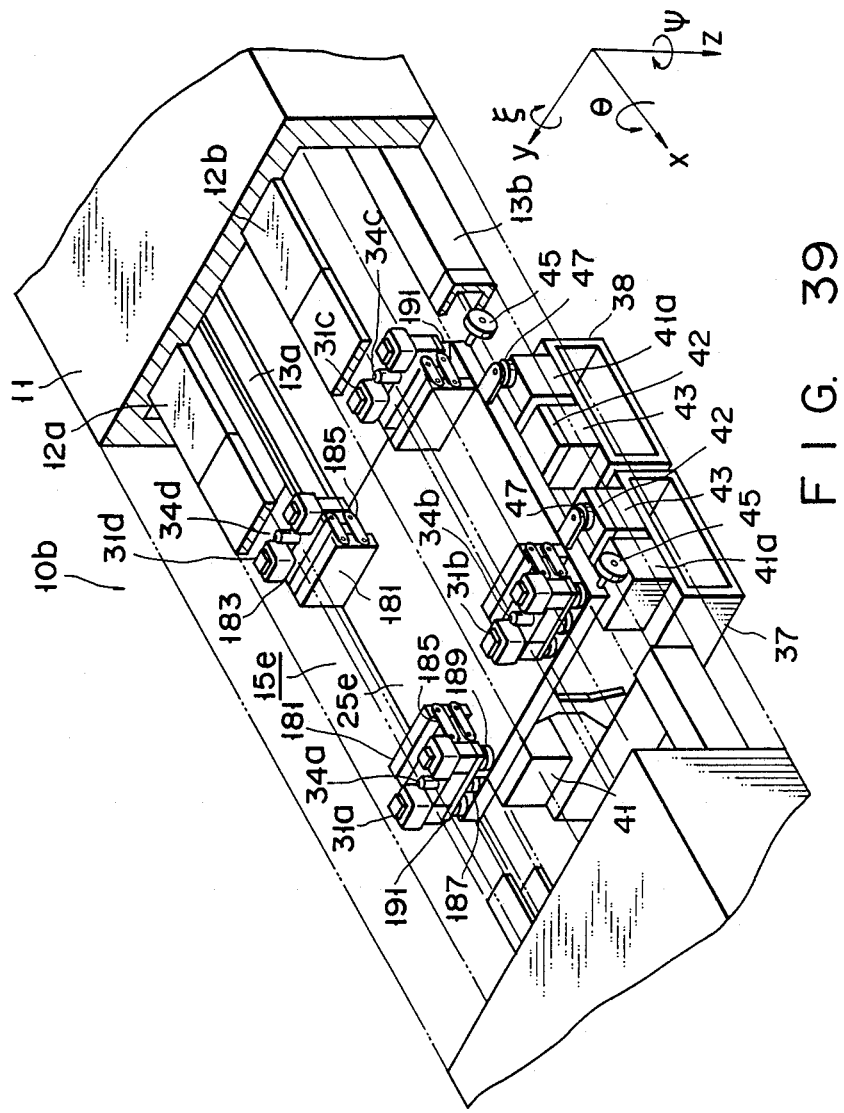

In the above-described cases, in order to independently change all the levitation gap lengths of a plurality of magnetic support units, a base is divided into a plurality of unit members, and the unit members are coupled to each other through a rotatable coupling mechanism. However, the present invention is not limited to this arrangement. For example, as shown in FIG. 39, support members 181 are respectively mounted on the four corners of a single flat base 25e, an L-shaped base 183 is mounted on each support member 181 through two pairs of parallel link mechanisms 185 so as to be movable only in the z direction (vertical direction), and magnetic support units 31a to 31d are respectively fixed to the L-shaped bases 183. In addition, a suspension 191 constituted by a spring 187 and a shock absorber 189 may be interposed between the lower surface of each L-shaped base 183 and the upper surface of the base 25e.

Figure 40:
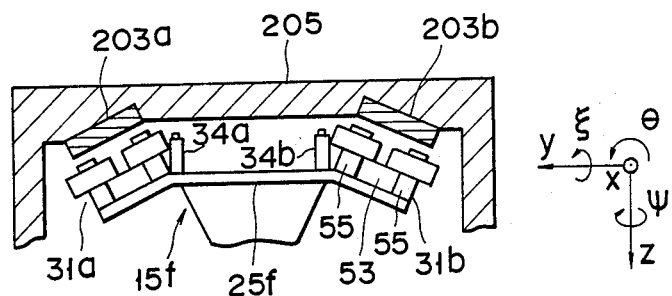
Figure 41:
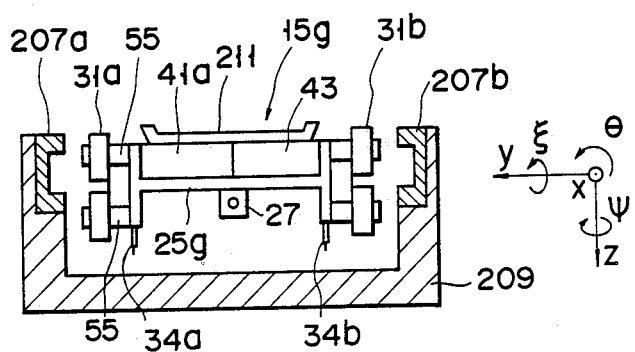

In addition, in the above-described cases, each magnetic support unit is horizontally mounted, and is disposed to oppose the lower surface of a corresponding guide rail, which is narrower than the length between the yokes of the magnetic support unit, so as to be shifted outward from the outer end of the lower surface of the guide rail. However, the present invention is not limited to this disposition and shape as long as supporting and guiding forces are simultaneously generated between the magnetic support units and the guide rails when a levitated object is in a magnetically stable levitated state. Any disposition and shape of guides or guide rails can be employed as long as this condition is satisfied. For example, as shown in FIGS. 40 and 41, various modifications can be made. According to a case shown in FIG. 40, flat guide rails 203a and 203b, each of which has a width equal to the length between the yokes of the magnetic support units 31a to 31d (the units 31c and 31d are not shown), are obliquely mounted on a track frame 205, and gap sensors 34a to 34d (the sensors 34c and 23d are not shown) are disposed on the upper surface of a base 25f so as to detect levitation gap lengths in the supporting direction. In this case, attraction generated between the units 31a to 31d, and the guide rails 203a and 203b is decomposed into a supporting force (in the z direction) and a guiding force (in the y direction). As a result, a strong guiding force can be obtained.

According to a case shown in FIG. 41, guide rails 207a and 207b, each of which has a U-shaped section opposing two yokes 55 of each of magnetic support units 31a to 31d (the units 31c and 31d are not shown), are vertically attached to a track frame 209. In addition, the units 31a to 31d (the units 31c and 31d are not shown) are respectively mounted on the four corners of the side surfaces of a base 25g constituted by two unit plates, each having a H-shaped section, coupled to each other through a coupling mechanism 27, and gap sensors 34a to 34d (the sensors 34c and 34d are not shown) facing down are attached to the lower faces of the four corners of the base 25g so as to detect levitation gap lengths in the supporting direction. Furthermore, a control unit 41a and a power source 43, which are divided into two units, and a carrier 211 are arranged on the two unit plates constituting the base 25g, thereby constituting a levitated object 15g. In this case, when the yokes 55 are shifted in the z direction, since the total weight of the levitated object 15g is supported by upward attraction acting on the guide rails 207a and 207b, most of the attraction between the yokes 55 and the guide rails 207a and 207b can be used as a guiding force.

Figure 42:
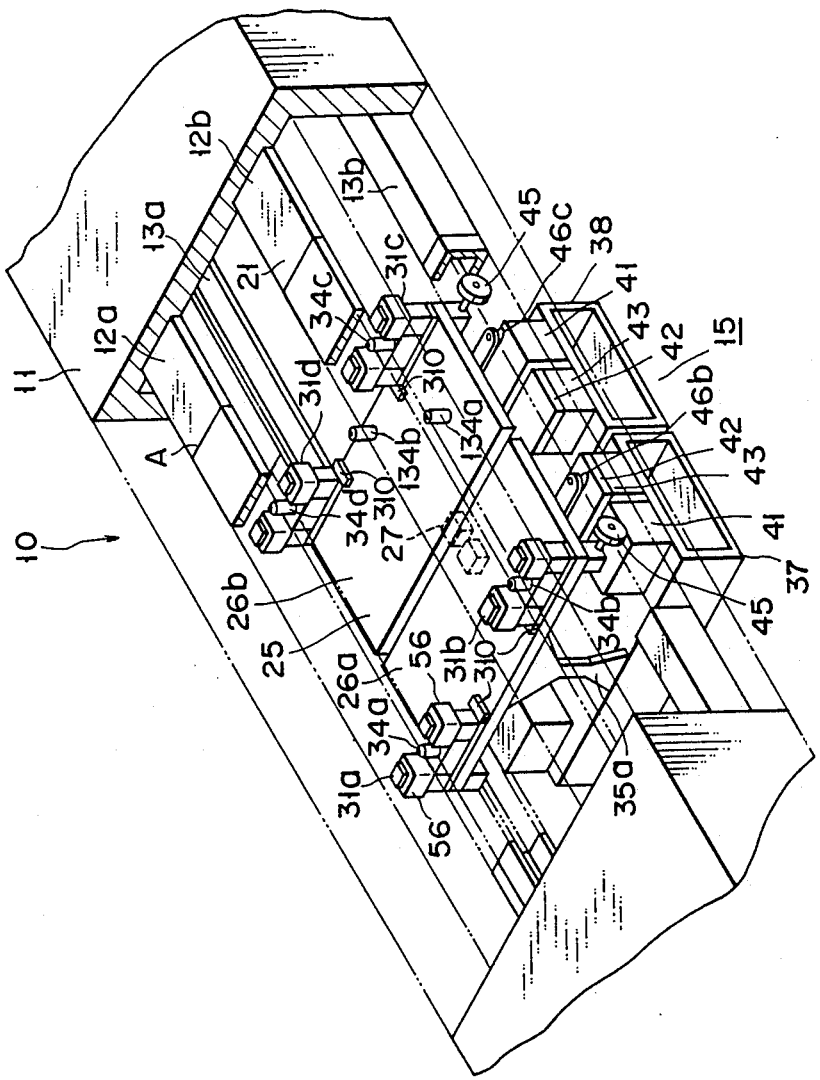

In the case of the fifth embodiment, the state observers output physical values required to control a guiding force. However, the present invention is not limited to such use of state observers. For example, state observers may be replaced with sensors, e.g., optical gap sensors 310 as shown in FIG. 42. In this case, the fifth embodiment becomes a modification of the first embodiment in which a traveling direction is changed by 90°.

In the cases described above, each magnetic support unit comprises a permanent magnet interposed between two electromagnets. However, the present invention is not limited to this arrangement. For example, a magnetic support unit may be constituted by only electromagnetic units.

In addition, in the cases described above, each control unit and its operation are described in accordance with analog control. However, the present invention is not limited to such an analog control system, and a digital control system may be employed.

Furthermore, in the cases described above, each levitated object is magnetically levitated by using two systems, namely, an individual mode control system for performing levitation control for each of motion coordinate systems of the same number as that of magnetic support units, and a current integration feedback system for feeding back the difference between an electromagnet exciting current detection value and its target value to an electromagnet exciting voltage through an integral compensator. However, the present invention is not limited to this as long as a single or plurality of physical values required to control a guiding force can be calculated from a single or plurality of physical values required to control a supporting force, which are obtained on the basis of outputs from sensors, and the calculation result can be used to perform levitation control of a levitated object in the guiding direction.

Various changes and modifications can be made within the spirit and scope of the present invention.

As has been described above, according to the present invention, the width of each magnetic support unit is set to be larger than the width of a corresponding guide rail, and the guide and the magnetic support unit are positioned such that the center of the magnetic support unit is displaced from that of the guide rail while a levitated state is stabilized. With this arrangement, each magnetic support unit can simultaneously generate supporting and guiding forces with respect to a corresponding guide. In addition, the guiding force is directly controlled by physical values detected by sensors, e.g., gap lengths between the magnetic support units and the guide rails, their rates of change, and electromagnet exciting currents, or is controlled by physical values calculated from other physical values. Therefore, electromagnets for performing levitation control in the guiding direction can be omitted, and a decrease in size and weight of each magnetic support unit can be achieved.

In addition, the strength of a structure such as guide rails for supporting a levitated object from the ground can be decreased, and hence the overall apparatus can be reduced in size and weight.

What is claimed is:

1. An attraction type magnetic levitating apparatus comprising:
    a ferromagnetic guide;
    a levitated object which is arranged below said guide, attracted by said guide, and levitated at a position where attraction and gravity corresponding to a weight of said levitated object are balanced, said levitated object having a magnetic support unit which is arranged to oppose said guide through a gap so as to simultaneously generate a supporting force for levitating said levitated object and a guiding force in a direction substantially perpendicular to a direction of the supporting force when said levitated object is stably levitated, said magnetic support unit including an electromagnet whose center is displaced from a center of said guide;
    sensor means for detecting a state of a magnetic circuit constituted by said electromagnet, said guide, and the gap, and obtaining a single or plurality of first physical values required to control the supporting force and a single or plurality of second physical values associated with said magnetic circuit and required to control the guiding force; and
    control means for controlling an exciting current of said electromagnet on the basis of an output from said sensor means, and stabilizing said magnetic circuit by controlling the support and guiding forces, thereby magnetically levitating said levitated object.

2. An attraction type magnetic levitating apparatus comprising:
    a ferromagnetic guide rail installed along a transportation path extending through a plurality of points;
    a levitated object which is arranged below said guide rail, attracted by said guide rail, and levitated at a position where attraction and gravity corresponding to a weight of said levitated object are balanced so as to freely travel along said guide rail, said levitated object having a magnetic support unit which is arranged to oppose said guide rail through a gap so as to simultaneously generate a supporting force for levitating said levitated object and a guiding force in a direction substantially perpendicular to a direction of the supporting force when said levitated object is stably levitated, said magnetic support unit including an electromagnet whose center is displaced from a center of said guide rail;
    means for applying a thrust to said levitated object so as to cause said levitated object to travel along said guide rail;
    sensor means for detecting a state of a magnetic circuit constituted by said electromagnet, said guide, and the gap, and obtaining a single or plurality of first physical values required to control the supporting force and a single or plurality of second physical values associated with said magnetic circuit and required to control the guiding force; and control means for controlling an exciting current of said electromagnets on the basis of an output from said sensor means, and stabilizing said magnetic circuit by controlling the support and guiding forces, thereby magnetically levitating said levitated object.

3. An apparatus according to any one of claims 1 and 2, wherein the second physical values include a displacement of said magnetic support unit in the guiding direction, a rate of change in the displacement on the time base, an external force acting on said levitated object, or a function thereof.

4. An apparatus according to any one of claims 1 and 2, wherein the first physical values include a distance of the gap in the supporting direction, a rate of change in the distance on the time base, an exciting current value of said electromagnet, or a function thereof.

5. An apparatus according to any one of claims 1 and 2, wherein said levitated object comprises
a plurality of magnetic support units and a gap independent varying mechanism for allowing said plurality of magnetic support units to independently move in the supporting force direction.

6. An apparatus according to claim 5, wherein said gap independent varying mechanism comprises a plurality of mounting plates for fixing said magnetic units in units of two and coupling means for coupling said mounting plates to each other so as to allow said mounting plates to rotate within a substantially vertical plane.

7. An apparatus according to any one of claims 1 and 2, wherein said support unit comprises a permanent magnet for supplying a magnetomotive force required to levitate said levitated object in said magnetic circuit.

8. An apparatus according to claim 1 wherein said magnetic unit is arranged to oppose said guide so as to cause the guiding forces perpendicular to each other to cause yawing of said levitated object in the same direction.

9. An apparatus according to claims 1 and 2 wherein said magnetic support unit comprises a permanent magnet for supplying a magnetomotive force required to levitate said levitated object in said magnetic circuit, and
said control means comprises zero-power levitation control means for always stabilizing said magnetic circuit in a state wherein the exciting current of said electromagnet is set to be substantially zero on the basis of the output from said sensor means.

10. An apparatus according to claim 2 wherein said guide rail comprises a branching portion for switching a first traveling direction and a first guiding direction of said levitated object so as to set the first traveling direction as a second guiding direction and set the first guiding direction as a second traveling direction.

11. An apparatus according to claim 2, wherein said guide rail comprises a branching portion for switching a first traveling direction and a first guiding direction of said levitated object so as to set the first traveling direction as a second guiding direction and set the first guiding direction as a second traveling direction, and
said sensor means comprises first sensor means for detecting the second physical values required to control the guiding fore in a first guiding direction, and second sensor means for detecting the second physical values required to control the guiding force in a second guiding direction.

12. An apparatus according to claim 11, wherein said control means comprises:
first compensating means for controlling the guiding force in the first guiding direction on the basis of the .second physical value detected by said first sensor means, and
second compensating means for controlling the guiding force in the second guiding direction on the basis of the second physical value detected by said second sensor means.

13. An apparatus according to claim 12, wherein said control means comprises:
guiding direction detecting means for detecting that the first guiding direction is switched to the second guiding direction, and
selecting means for selecting said first and second compensating means on the basis of a detection signal from said guiding direction detecting means.

* * * * *